(12) United States Patent
Alasti et al.

(10) Patent No.: US 11,910,237 B2
(45) Date of Patent: *Feb. 20, 2024

(54) USER PLANE FUNCTION (UPF) LOAD BALANCING BASED ON CURRENT UPF LOAD AND THRESHOLDS THAT DEPEND ON UPF CAPACITY

(71) Applicant: DISH WIRELESS L.L.C., Englewood, CO (US)

(72) Inventors: Mehdi Alasti, Reston, VA (US); Kazi Bashir, Lewisville, TX (US); Ash Khamas, Goffstown, NM (US); Ashish Bansal, Frisco, TX (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,710

(22) Filed: Jan. 5, 2023

(65) Prior Publication Data

US 2023/0147177 A1 May 11, 2023

Related U.S. Application Data

(63) Continuation of application No. 17/400,943, filed on Aug. 12, 2021, now Pat. No. 11,582,641.

(51) Int. Cl.
*H04W 28/08* (2023.01)
*H04W 72/52* (2023.01)

(52) U.S. Cl.
CPC .......... *H04W 28/08* (2013.01); *H04W 72/52* (2023.01)

(58) Field of Classification Search
None
See application file for complete search history.

(56) References Cited

U.S. PATENT DOCUMENTS 7,039,033 B2    5/2006    Haller et al.
7,864,043 B2    1/2011    Camp et al.
(Continued)

FOREIGN PATENT DOCUMENTS

CN    110662260 A    1/2020
CN    112567799 A    3/2021
(Continued)

OTHER PUBLICATIONS

International Search Report and Written Opinion received for PCT Patent Application No. PCT/US2022/049596, dated Mar. 3, 2023, 10 pages.
(Continued)

*Primary Examiner* — Mohammad S Adhami
(74) *Attorney, Agent, or Firm* — Jeremiah J. Baunach; VLP Law Group LLP

(57) ABSTRACT

Embodiments are directed towards embodiments are directed toward systems and methods for user plane function (UPF) and network slice load balancing within a 5G network. Example embodiments include systems and methods for load balancing based on current UPF load and thresholds that depend on UPF capacity; UPF load balancing using predicted throughput of new UE on the network based on network data analytics; UPF load balancing based on special considerations for low latency traffic; UPF load balancing supporting multiple slices, maintaining several load-thresholds for each UPF and each slice depending on the UPF and network slice capacity; and UPF load balancing using predicted central processing unit (CPU) utilization and/or predicted memory utilization of new UE on the network based on network data analytics.

20 Claims, 21 Drawing Sheets

(56) References Cited

U.S. PATENT DOCUMENTS

| | | |
|---|---|---|
| 8,015,306 B2 | 9/2011 | Bowman |
| 8,131,212 B2 | 3/2012 | Laufer |
| 8,131,272 B2 | 3/2012 | Paalasmaa et al. |
| 10,470,152 B2 | 11/2019 | Park et al. |
| 10,568,061 B1 | 2/2020 | Park et al. |
| 10,602,415 B2 | 3/2020 | Bae et al. |
| 10,708,824 B2 | 7/2020 | Lee et al. |
| 10,841,838 B2 | 11/2020 | Zhang et al. |
| 11,051,192 B2 | 6/2021 | Li et al. |
| 11,096,046 B2 | 8/2021 | Li et al. |
| 11,343,698 B2 | 5/2022 | Jeong et al. |
| 11,356,419 B1 | 6/2022 | Nosalis et al. |
| 11,412,412 B2 | 8/2022 | Narath et al. |
| 11,477,694 B1 | 10/2022 | Alasti et al. |
| 11,483,738 B1 | 10/2022 | Alasti et al. |
| 11,516,090 B2 | 11/2022 | Rtenblad et al. |
| 11,563,713 B2 | 1/2023 | Feng |
| 11,582,641 B1 | 2/2023 | Alasti et al. |
| 11,595,851 B1 | 2/2023 | Alasti et al. |
| 11,601,367 B2 | 3/2023 | Delos et al. |
| 11,627,492 B2 | 4/2023 | Alasti et al. |
| 2002/0180887 A1 | 12/2002 | Kim et al. |
| 2005/0266798 A1 | 12/2005 | Moloney et al. |
| 2006/0003802 A1 | 1/2006 | Sinai |
| 2006/0234631 A1 | 10/2006 | Dieguez |
| 2008/0007651 A1 | 1/2008 | Bennett |
| 2008/0147798 A1 | 6/2008 | Paalasmaa et al. |
| 2009/0112980 A1 | 4/2009 | Fujimoto |
| 2009/0177996 A1 | 7/2009 | Hunt et al. |
| 2009/0238170 A1 | 9/2009 | Rajan et al. |
| 2009/0251594 A1 | 10/2009 | Hua et al. |
| 2009/0325595 A1 | 12/2009 | Farris |
| 2010/0031139 A1 | 2/2010 | Ihara |
| 2010/0167646 A1 | 7/2010 | Alameh et al. |
| 2010/0194753 A1 | 8/2010 | Robotham et al. |
| 2011/0028129 A1 | 2/2011 | Hutchison et al. |
| 2011/0304583 A1 | 12/2011 | Kruglick |
| 2012/0170561 A1 | 7/2012 | Tsai et al. |
| 2012/0190299 A1 | 7/2012 | Takatsuka et al. |
| 2012/0290653 A1 | 11/2012 | Sharkey |
| 2012/0317194 A1 | 12/2012 | Tian |
| 2013/0090064 A1 | 4/2013 | Herron et al. |
| 2013/0147845 A1 | 6/2013 | Xie et al. |
| 2015/0128030 A1 | 5/2015 | Tyagi |
| 2016/0203585 A1 | 7/2016 | Welinder et al. |
| 2016/0231978 A1 | 8/2016 | Hawver et al. |
| 2016/0234522 A1 | 8/2016 | Lu et al. |
| 2016/0316243 A1 | 10/2016 | Park et al. |
| 2017/0099159 A1 | 4/2017 | Abraham |
| 2018/0262924 A1 | 9/2018 | Dao et al. |
| 2018/0324646 A1 | 11/2018 | Lee et al. |
| 2019/0053117 A1 | 2/2019 | Bae et al. |
| 2019/0075431 A1 | 3/2019 | Albasheir et al. |
| 2019/0191330 A1 | 6/2019 | Dao et al. |
| 2020/0068587 A1 | 2/2020 | Garcia Azorero et al. |
| 2021/0045091 A1 | 2/2021 | Arora et al. |
| 2021/0051531 A1 | 2/2021 | Alasti et al. |
| 2021/0105652 A1 | 4/2021 | Jeong et al. |
| 2021/0219179 A1 | 7/2021 | Narath et al. |
| 2021/0288886 A1 | 9/2021 | Örtenblad et al. |
| 2021/0314842 A1 | 10/2021 | Padlikar et al. |
| 2021/0329485 A1 | 10/2021 | Han et al. |
| 2021/0377807 A1 | 12/2021 | Lee |
| 2021/0385625 A1 | 12/2021 | Qiao et al. |
| 2022/0039177 A1 | 2/2022 | Talebi Fard et al. |
| 2022/0078857 A1 | 3/2022 | Kim |
| 2022/0159605 A1 | 5/2022 | Li et al. |
| 2022/0210658 A1 | 6/2022 | Lee |
| 2022/0247688 A1 | 8/2022 | Puente et al. |
| 2022/0264258 A1 | 8/2022 | Zong et al. |
| 2022/0337480 A1 | 10/2022 | Vanajakshi et al. |
| 2022/0368675 A1 | 11/2022 | Narula et al. |
| 2022/0369170 A1 | 11/2022 | Roeland et al. |
| 2022/0369204 A1 | 11/2022 | Jeong et al. |
| 2023/0067535 A1 | 3/2023 | Alasti et al. |
| 2023/0156522 A1 | 5/2023 | Bashir et al. |
| 2023/0239227 A1 | 7/2023 | Espinosa et al. |
| 2023/0275832 A1 | 8/2023 | Lam |

FOREIGN PATENT DOCUMENTS

| | | |
|---|---|---|
| CN | 112867050 A | 5/2021 |
| CN | 113475123 A | 10/2021 |
| EP | 3955523 A1 | 2/2022 |
| KR | 10-2106778 B1 | 5/2020 |
| WO | 2019160546 A1 | 8/2019 |
| WO | 2020032769 A1 | 2/2020 |
| WO | 2021063515 A1 | 4/2021 |
| WO | 2021091225 A1 | 5/2021 |
| WO | 2021155940 A1 | 8/2021 |
| WO | 2021261074 A1 | 12/2021 |
| WO | 2022/033896 A1 | 2/2022 |
| WO | 2022053134 A1 | 3/2022 |
| WO | 2022098696 A1 | 5/2022 |
| WO | 2022157667 A1 | 7/2022 |
| WO | 2022192523 A1 | 9/2022 |

OTHER PUBLICATIONS

3rd Generation Partnership Project; Technical Specification Group Services and System Aspects; System architecture for 5G System (5GS); Stage 2 (Release 16), vol. SA WG2, No. V16.9.0, Jun. 24, 2021, pp. 1-452.

PCT Search Report and Written Opinion, PCT/US2022/41343, dated Dec. 5, 2022, 19 pages.

PCT Search Report and Written Opinion, PCT/US2022/041334, dated Nov. 30, 2022, 19 pages.

PCT Search Report and Written Opinion, PCT/US2022/040157, dated Nov. 21, 2022, 17 pages.

3GPP TS , "3rd Generation Partnership Project; Technical Specification Group Core Network and Terminals; 5G System; Network Data Analytics Services; Stage 3 (Release 17)", 3GPP TS 29.520 V 17.4.0, Sep. 2021, 133 pages; https://portal.3gpp.org/desktopmodules/Specifications/SpecificationDetails.aspx?specificationId=3355.

Alasti, Mehdi, et al., "User Plane Function (UPF) Load Balancing Based on Special Considerations for Low Latency Traffic", U.S. Appl. No. 17/458,120, filed Aug. 26, 2021, 62 pages.

Alasti, Mehdi, et al., "User Plane Function (UPF) Load Balancing Supporting Multiple Slices", U.S. Appl. No. 17/458,889, filed Aug. 27, 2021, 67 pages.

Alasti, Mehdi, et al., "User Plane Function (UPF) Load Balancing Based on Central Processing Unit (CPU) and Memory Utilization of the User Equipment (UE) in the UPF", U.S. Appl. No. 17/459,279, filed Aug. 27, 2021, 63 pages.

Alasti, Mehdi, et al., "User Plane Function (UPF) Load Balancing Based on Current UPF Load and Thresholds That Depend on UPF Capacity", U.S. Appl. No. 17/400,943, filed Aug. 12, 2021, 65 pages.

Alasti, Mehdi, et al., "User Plane Function (UPF) Load Balancing Based on Network Data Analytics to Predict Load of User Equipment", U.S. Appl. No. 17/458,117, filed Aug. 26, 2021, 63 pages.

Bashir, Kazi, et al., "Predictive User Plane Function (UPF) Load Balancing Based on Network Data Analytics", U.S. Appl. No. 17/529,128, filed Nov. 17, 2021, 32 pages.

Marappan, Satheesh, "NWDAF: Automating the 5G Network with Machine Learning & Data analytics", Oct. 20, 2020, 6 pages.

Samsung, et al., "Key Issue 6 Solution Evaluation and Conclusion", 3GPP Draft; S2-1812183_KEY Issue 6 Solution Evaluation and Conclusion, 3rd Generation Partnership Project (3GPP), vol. SA WG2, XP051498907, Nov. 26-30, 2018, West Palm Beach, US, 10 pages: http://www.3gpp.org/ftp/tsg%5Fsa/WG2%5FArch/TSGS2%5F129BIS%5FWest%5FPalm%5FBeach/Docs/S2%2D1812183%2Ezip.

300

302 generate weights for selecting the UPF based on the determined load-regions 304 select the UPF based on the generated weights

702 use artificial intelligence (AI) or machine learning (ML) algorithms to perform predictive analysis of throughput of the new UE and resulting load 704 implement a weighted scheduling of load on UPFs to achieve UPF load-balancing based on the predicted throughput of the new UE and resulting predicted load on a UPF of the new UE

1602 use artificial intelligence (AI) or machine learning (ML) algorithms to perform predictive analysis of CPU utilization and/or memory utilization of the new UE and resulting load 1604 implement a weighted scheduling of load on UPFs to achieve UPF load-balancing based on one or more of the predicted CPU utilization and predicted memory utilization of the new UE and resulting predicted load on a UPF of the new UE

FIG. 16

| Load region | Percentage of Total Capacity |
|---|---|
| Low | < 30% |
| Medium | ≥ 30% and < 55% |
| High | ≥ 55% and < 75% |
| Very High | ≥ 75% |

FIG. 17

Non-low Latency Traffic Load-Regions*

| Load region | Percentage of Total Capacity |
|---|---|
| Low | < 20% |
| Medium | ≥ 20% and < 45% |
| High | ≥ 45% and < 65% |
| Very High | ≥ 65% |

*10% of UPF capacity dedicated for low latency PDU sessions

*FIG. 20*

ND THRESHOLDS THAT DEPEND
ON UPF CAPACITY

USER PLANE FUNCTION (UPF) LOAD BALANCING BASED ON CURRENT UPF LOAD AND THRESHOLDS THAT DEPEND ON UPF CAPACITY

TECHNICAL FIELD

The present disclosure relates generally to digital message communications and, more particularly, to user plane function (UPF) load balancing within a Fifth Generation (5G) communications network.

BRIEF SUMMARY

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of 5G has resulted in faster speeds and increased bandwidth, but with the drawback of potentially overloading certain portions of the network in certain circumstances. It is with respect to these and other considerations that the embodiments described herein have been made.

5G Core (5GC) is the heart of a 5G mobile network. It establishes reliable, secure connectivity to the network for end users and provides access to its services. The core domain handles a wide variety of essential functions in the mobile network, such as connectivity of new user equipment (UE) and mobility management, authentication and authorization, subscriber data management and policy management, among others. 5G Core network functions are completely software-based and designed as cloud-native, meaning that they're agnostic to the underlying cloud infrastructure, allowing higher deployment agility and flexibility.

With the advent of 5G, industry experts defined how the core network should evolve to support the needs of 5G New Radio (NR) and the advanced use cases enabled by it. Together, they developed the 3rd Generation Partnership Project (3GPP) standard for core networks known as 5G Core (5GC).

The 5GC architecture is based on what is called a Service-Based Architecture (SBA), which implements IT network principles and a cloud-native design approach. In this architecture, each network function (NF) offers one or more services to other NFs via Application Programming Interfaces (API). Each NF, such as the user plane function (UPF) and the Session Management Function (SMF) is formed by a combination of small pieces of software code called as microservices. Some microservices can even be re-used for different NFs, making implementation more effective and facilitating independent life-cycle management—which allows upgrades and new functionalities to be deployed with zero impact on running services.

Briefly described, embodiments are directed toward systems and methods for user plane function (UPF) and network slice load balancing within a 5G network. Example embodiments include: systems and methods for load balancing based on current UPF load and thresholds that depend on UPF capacity; systems and methods for UPF load balancing using predicted throughput of new UE on the network based on network data analytics; systems and methods for UPF load balancing based on special considerations for low latency traffic; systems and methods for UPF load balancing supporting multiple slices, maintaining several load-thresholds for each UPF and each slice depending on the UPF and network slice capacity; and systems and methods for UPF load balancing using predicted central processing unit (CPU) utilization and/or predicted memory utilization of new UE on the network based on network data analytics.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 3 illustrates a logical flow diagram showing one embodiment of a process for selecting the UPF based on generated weights, which is useful in the process of FIG. 2 in accordance with embodiments described herein;

FIG. 7 illustrates a logical flow diagram showing one embodiment of a process for selecting the UPF using artificial intelligence (AI) or machine learning (ML) algorithms to perform predictive analysis of throughput, which is useful in the process of FIG. 6 in accordance with embodiments described herein;

FIG. 16 illustrates a logical flow diagram showing one embodiment of a process for selecting the UPF using AI or machine learning (ML) algorithms to perform predictive analysis of CPU utilization and/or predicted memory utilization, which is useful in the process of FIG. 15 in accordance with embodiments described herein;

FIG. 17 illustrates a chart showing an example of possible load-regions that a current load of a UPF may be determined to fall within that may be used in the processes of FIGS. 2-7 and 15-17 in accordance with embodiments described herein.

FIG. 20 illustrates a chart showing an example of possible load-regions for non-low latency traffic that a current load of a UPF may be determined to fall within that may be used in the processes of FIGS. 8-10 in accordance with embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
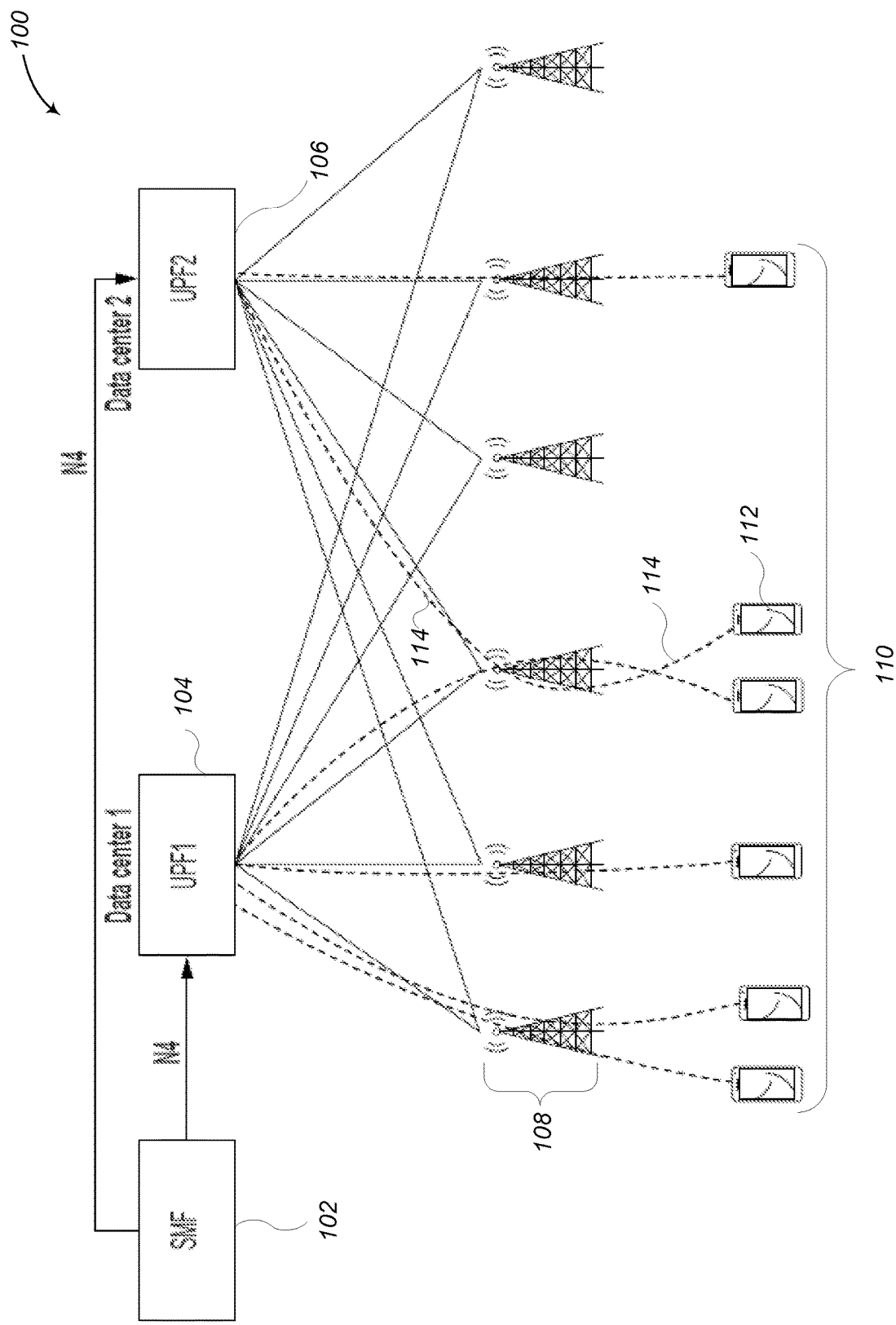
FIG. 1 illustrates a context diagram of an environment in which UPF load balancing may be implemented in accordance with embodiments described herein.

FIG. 1 illustrates a context diagram of an environment 100 in which UPF load balancing may be implemented in accordance with embodiments described herein.

UEs 110, such as cellular telephones or other Internet-of-Tings (IoT) devices use 5G wireless cellular telecommunication technology defined by standards set by 3GPP and International Telecommunications Union (ITU) to get data connectivity between applications on the UE and Data Networks (DNs) such as the Internet or private corporate networks. Almost all applications running on the UE, including voice, require such data connectivity. A Protocol Data Unit (PDU) session provides connectivity between applications on a UE and a DN. The UE receives services through a PDU session, which is a logical connection between the UE and DN. A DN is identified by a Data Network Name (DNN). PDU sessions can provide different types of transport services corresponding to the nature of the PDU(s) carried over the PDU session. In various embodiments, a PDU session may be associated with a single DNN and with a single slice identified by Single-Network Slice Selection Assistance Information (S-NSSAI).

The UPF is one of the network functions (NFs) of the 5GC. The UPF, comprising UPF1 104 and UPF2 106 in the present example, is responsible for packet routing and forwarding, packet inspection, quality of service (QoS) handling, and interconnecting external PDU sessions with the DN. Although two UPFs (UPF1 104 and UPF2 106) are shown in the present example, additional UPFs may be utilized in various other embodiments. Each UPF (e.g., UPF1 104 and UPF2 106) is a virtual network function responsible for PDU sessions between the UEs 110 and the DN by anchoring the PDU sessions of various UEs 110 on the individual UPF. The SMF 102 is also one of the NFs of the 5GC and is primarily responsible for interacting with the decoupled data plane, creating updating and removing PDU sessions, selecting particular UPFs on which to anchor PDU sessions when new UEs appear on the network and managing session context with the UPF. Many of such functions are described in the 3GPP TS 23.501 specification.

A network function, such as the SMF 102 and the UPF, such as UPF1 104 and UPF2 106, can be implemented either as a network elements on dedicated hardware, as a software instance running on dedicated hardware, or as a virtualized function instantiated on an appropriate platform, e.g., a cloud infrastructure. In the present example, UPF1 104 is implemented at data center 1 and UPF2 106 is implemented at data center 2, which is geographically separated from data center 1. The SMF 102 sends messages to the UPF (comprising UPF 1 104 and UPF 2 in the present example) over the N4 reference interface using the Packet Forwarding Control Protocol (PFCP). The PFCP may employ UDP port (8805) and is defined to support Control and User Plane Separation (CUPS). Decoupling other control plane functions from the user plane, together with the 5G Core Access and Mobility Management Function (AMF) (not shown), the SMF 102 performs the role of Dynamic Host Control Protocol (DHCP) server and Internet Protocol (IP) Address Management (IPAM) system. Together with the UPF, the SMF 102 maintains a record of PDU session state by means of a 24bit PDU Session ID. The SMF 102 sets configuration parameters in the UPF that define traffic steering parameters and ensure the appropriate routing of packets while guaranteeing the delivery of incoming packets, though a Downlink (DL) data notification.

In the present example embodiment, each UPF1 104 and UPF2 106 may have the ability to establish network connectivity and anchor PDU sessions of any UE on the network via various cellular telecommunication base stations and associated antennas 108. To maximize network performance, PDU sessions are by default anchored on the UPF at the data center that is closest geographically to the UE, as illustrated by most of the dashed lines in FIG. 1 for UEs 110 (and an operator defines a service area for each UPF). However, each UPF (e.g., UPF1 104 and UPF2 106) has a maximum network capacity to handle PDU sessions anchored thereon and the associated network traffic. Thus, PDU sessions anchored on a particular UPF (e.g., UPF1 104) and their associated network traffic may cause the UPF to near its maximum capacity or become overloaded. UPF load balancing may then cause the PDU session of the next new UE appearing on the network (e.g., UE 112) to be anchored on a UPF at a data center (e.g., UPF2 106) that is further away than the data center that is closest geographically to the UE. In the present example, UPF1 104 is at or near its maximum capacity with the PDU sessions of all the other UEs currently anchored on it, so UE 112 has a PDU session anchored on UPF2 106 (as shown by dashed line 114) instead of UPF1 104, even though data center 2 of UPF2 106 is further away from the UE 112 than data center 1 of UPF1 104. In various embodiments described herein, there are different particular scenarios and rules in which UPF load balancing may cause the PDU session of the next new UE appearing on the network to be anchored on a UPF at a data center that is further away than the data center that is closest geographically to the UE, which improves overall UPF load balancing and network performance.

Figure 2:
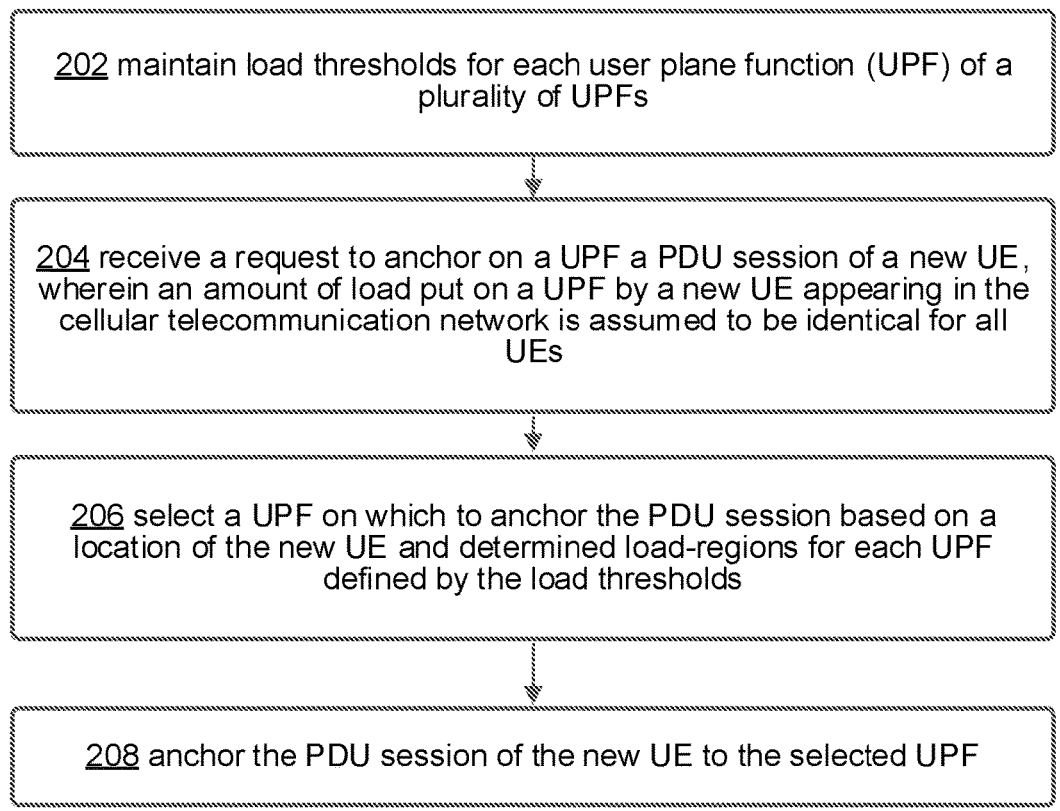
FIG. 2 illustrates a logical flow diagram showing one embodiment of a process for load balancing based on current UPF load and thresholds that depend on UPF capacity in accordance with embodiments described herein.

FIG. 2 illustrates a logical flow diagram showing one embodiment of a process 200 for load balancing based on current UPF load and thresholds that depend on UPF capacity in accordance with embodiments described herein.

At 202, the SMF 102 maintains load thresholds for each user plane function (UPF) of a plurality of UPFs in a cellular telecommunication network. The plurality of UPFs serve as anchor points between UE in the cellular telecommunication network and a DN. Each UPF of the plurality of UPFs is a virtual network function responsible for interconnecting PDU sessions between the UE and the DN by anchoring the PDU sessions on individual UPFs. The load thresholds for each UPF depend on a respective capacity of each UPF to have PDU sessions anchored thereon. In the present example embodiment, an amount of load put on a UPF by a UE appearing in the cellular telecommunication network is assumed to be identical for all UEs appearing in the cellular telecommunication network.

At 204, the SMF 102 receives a request to anchor on a UPF a PDU session of a new UE newly appearing on the cellular telecommunication network.

At 206, the SMF 102 selects a UPF of the plurality of UPFs on which to anchor the PDU session based on a location of the new UE and determined load-regions for each UPF of the plurality of UPFs defined by the load thresholds.

At 208, the SMF 102 anchors the PDU session of the new UE to the selected UPF.

FIG. 3 illustrates a logical flow diagram showing one embodiment of a process 300 for selecting the UPF based on generated weights, which is useful in the process 200 of FIG. 2 in accordance with embodiments described herein.

At 302, the SMF 102 generates weights for selecting the UPF based on the determined load-regions.

At 304, the SMF 102 selects the UPF based on the generated weights.

Figure 4:
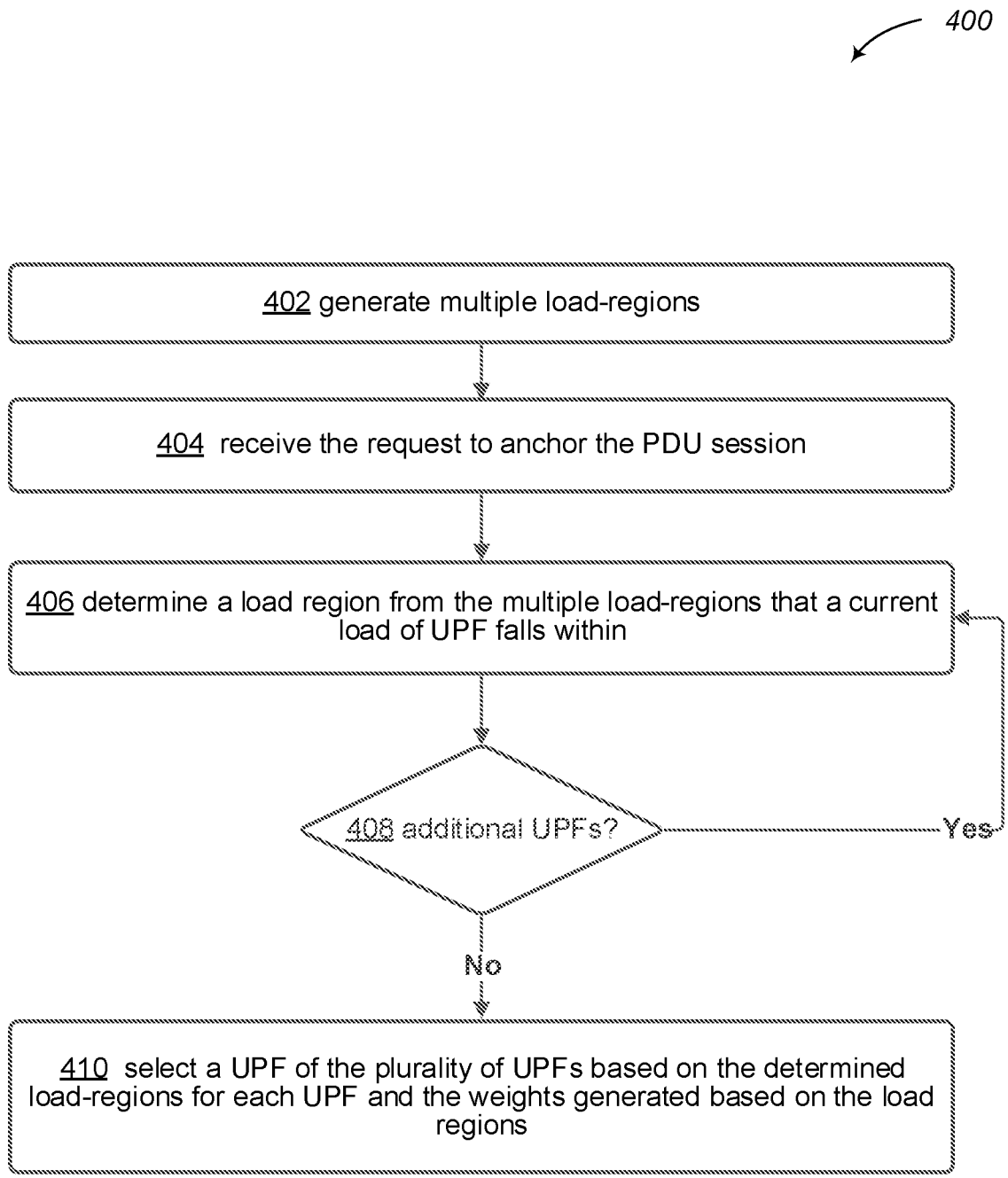
FIG. 4 illustrates a logical flow diagram showing one embodiment of a process for selecting the UPF based on the determined load-regions for a plurality of UPFs and the weights generated based on the determined load regions, which is useful in the process of FIG. 3 in accordance with embodiments described herein.

FIG. 4 illustrates a logical flow diagram showing one embodiment of a process 400 for selecting the UPF based on the determined load-regions for a plurality of UPFs and the weights generated based on the determined load regions, which is useful in the process 300 of FIG. 3 in accordance with embodiments described herein.

At 402, the SMF 102 generates multiple load-regions. Each load-region corresponds to a different range of current load of a UPF defined by one or more of lower and upper threshold percentages of UPF load capacity.

At 404, the SMF 102 receives the request to anchor the PDU session.

At 406, the SMF 102 determines a load region from the multiple load-regions that a current load of the UPF falls within.

At 408, the SMF 102 determines whether there are additional UPFs in the plurality of UPFs on which the PDU session may be anchored. If it is determined there are additional UPFs on which the PDU session may be anchored, then the process 400 proceeds back to 406 to determine a load region from the multiple load-regions that a current load of the additional UPF falls within. If it is determined there are not additional UPFs on which the PDU session may be anchored, then the process 400 proceeds to 410.

At 410, the SMF 102 selects a UPF of the plurality of UPFs based on the determined load-regions for the plurality of UPFs and the weights generated based on the determined load regions.

In an example embodiment, the SMF 102 generates a lowest load-region indicating a current UPF load less than a first threshold percentage of UPF capacity; generates one or more intermediate non-overlapping load-regions each defined by respective lower and upper threshold percentages of UPF capacity and indicating a current load greater than the lowest load-region; and generates a highest load-region indicating a current UPF load greater than a second threshold percentage of UPF capacity and greater than the intermediate non-overlapping load-regions.

In the present example embodiment, each UPF is associated with a different respective geographic UPF service area.

Selecting the UPF based on the generated weights and the determined load-regions for the UPFs may include determining a particular UPF has (i.e., is at a data center in) a respective geographic area within which the location of the new UE falls (i.e., is at a data center that is closest geographically to the UE compared to data centers of other UPFs). The particular UPF may then be selected in response to the determined load-region of the particular UPF being a load-region indicating its current load is below a threshold capacity.

In some embodiments, the SMF 102 determines a particular UPF has a respective geographic area within which the location of the new UE falls. The SMF 102 determines whether the particular UPF has a determined load region indicating its current load is in a different load region indicating a higher current load of the particular UPF than a current load of another UPF. In response to this determination, the SMF 102 weights the selection of a UPF. In particular, the UPF selection by the SMF for load-balancing is based on weighted scheduling of load (UEs) on the UPFs. This weighted scheduling may be credit/token-based (e.g., weighted round robin) or probability based (e.g., using statistical based scheduling algorithms using probability). For example, the SMF 102 may weight the selection of a UPF such that a probability that the particular UPF is selected is lower than a probability of selection of the other UPF. In some embodiments, the selection of the UPF is weighted by using credit/token-based weighted scheduling or probability-based weighted scheduling such that the frequency of selection of the particular UPF decreases as a difference between a higher current load of the particular UPF and a lower current load of at least one UPF of the plurality of UPFs increases, as indicated by the load regions determined for each UPF of the plurality of UPFs.

Figure 5:
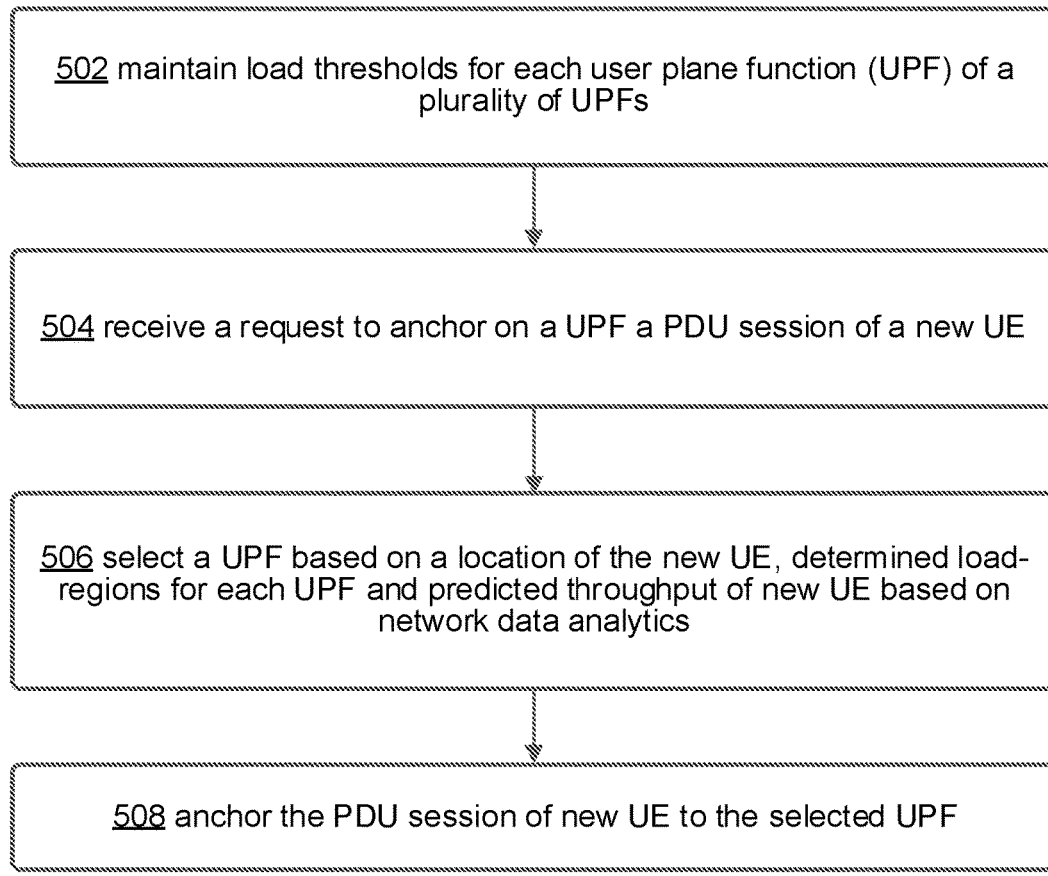
FIG. 5 illustrates a logical flow diagram showing one embodiment of a process for UPF load balancing using predicted throughput of new user equipment (UE) on the network based on network data analytics in accordance with embodiments described herein.

FIG. 5 illustrates a logical flow diagram showing one embodiment of a process 500 for UPF load balancing using predicted throughput of a new UE on the network based on network data analytics in accordance with embodiments described herein.

At 502, the SMF 102 maintains load thresholds for each user plane function (UPF) of a plurality of UPFs in a cellular telecommunication network. The plurality of UPFs serve as anchor points between UE in the cellular telecommunication network and a DN. Each UPF of the plurality of UPFs is a virtual network function responsible for interconnecting PDU sessions between the UE and the DN by anchoring the PDU sessions on individual UPFs. The load thresholds for each UPF depend on a respective capacity of each UPF to have PDU sessions anchored thereon. However, in the present example embodiment, an amount of load put on a UPF by a UE appearing in the cellular telecommunication network is not assumed to be identical for all UEs appearing in the cellular telecommunication network.

At 504, the SMF 102 receives a request to anchor on a UPF a PDU session of a new UE newly appearing on the cellular telecommunication network.

At 506, the SMF 102 selects a UPF of the plurality of UPFs on which to anchor the PDU session based on a location of the new UE, determined load-regions for each UPF of the plurality of UPFs defined by the load thresholds and predicted throughput of the new UE based on network data analytics. In an example embodiment, the network data analytics is provided via a network data analytics function (NWDAF) of a 5G mobile network of which the cellular telecommunication network is comprised.

At 508, the SMF 102 anchors the PDU session of the new UE to the selected UPF.

Figure 6:
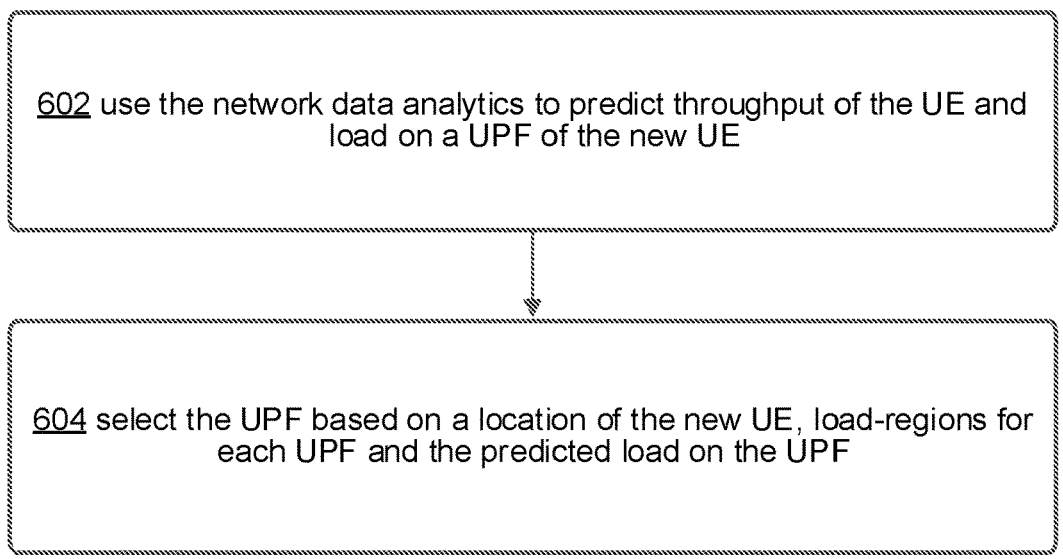
FIG. 6 illustrates a logical flow diagram showing one embodiment of a process for selecting the UPF, which is useful in the process of FIG. 5 in accordance with embodiments described herein.

FIG. 6 illustrates a logical flow diagram showing one embodiment of a process 600 for selecting the UPF, which is useful in the process 500 of FIG. 5 in accordance with embodiments described herein.

At 602, in selecting the UPF, the SMF 102 uses the network data analytics to predict throughput of the UE and load on a UPF of the new UE appearing on the cellular telecommunication network based on the predicted throughput.

At 604, the SMF 102 selects a UPF of the plurality of UPFs on which to anchor the PDU session based on a location of the new UE, load-regions for each UPF of the plurality of UPFs defined by the load thresholds and the predicted load of the new UE on a UPF.

FIG. 7 illustrates a logical flow diagram showing one embodiment of a process 700 for selecting the UPF using artificial intelligence (AI) or machine learning (ML) algorithms to perform predictive analysis of throughput, which is useful in the process 600 of FIG. 6 in accordance with embodiments described herein.

At 702, in using the network data analytics to predict throughput of the new UE and load on a UPF, the SMF 102 uses artificial intelligence (AI) or machine learning (ML) algorithms to perform predictive analysis of throughput of the new UE and resulting load on a UPF of the new UE appearing on the cellular telecommunication network based on historical activity of the new UE appearing on the cellular telecommunication network.

At 704, the SMF 102 implements a weighted scheduling of load on UPFs to achieve UPF load-balancing based on the predicted throughput of the new UE and resulting predicted load on a UPF of the new UE. This weighted scheduling can be implemented using credit/token based scheduling algorithms or statistical based scheduling algorithms (using probability). For example, in one embodiment, the SMF 102 changes a probability of whether a particular UPF of the plurality of UPFs will be selected based on the predicted throughput of the new UE and resulting predicted load on a UPF of the new UE. In an example embodiment, the SMF 102 changes a probability of whether a particular UPF will be selected based on the predicted throughput of the new UE and resulting predicted load on a UPF of the new UE. For example, the SMF 102 may increase a probability that a particular UPF will be selected in response to a current load of the particular UPF being currently in a particular load-region as compared to other UPFs and the predicted load being at a particular level. The SMF 102 may decrease a probability that the particular UPF will be overloaded beyond a threshold amount compared to other UPFs based on the predicted load by changing the probability of whether the particular UPF will be selected based on the predicted load Such load balancing may instead be achieved using credit/token based scheduling (e.g., weighted round robin).

Figure 8:
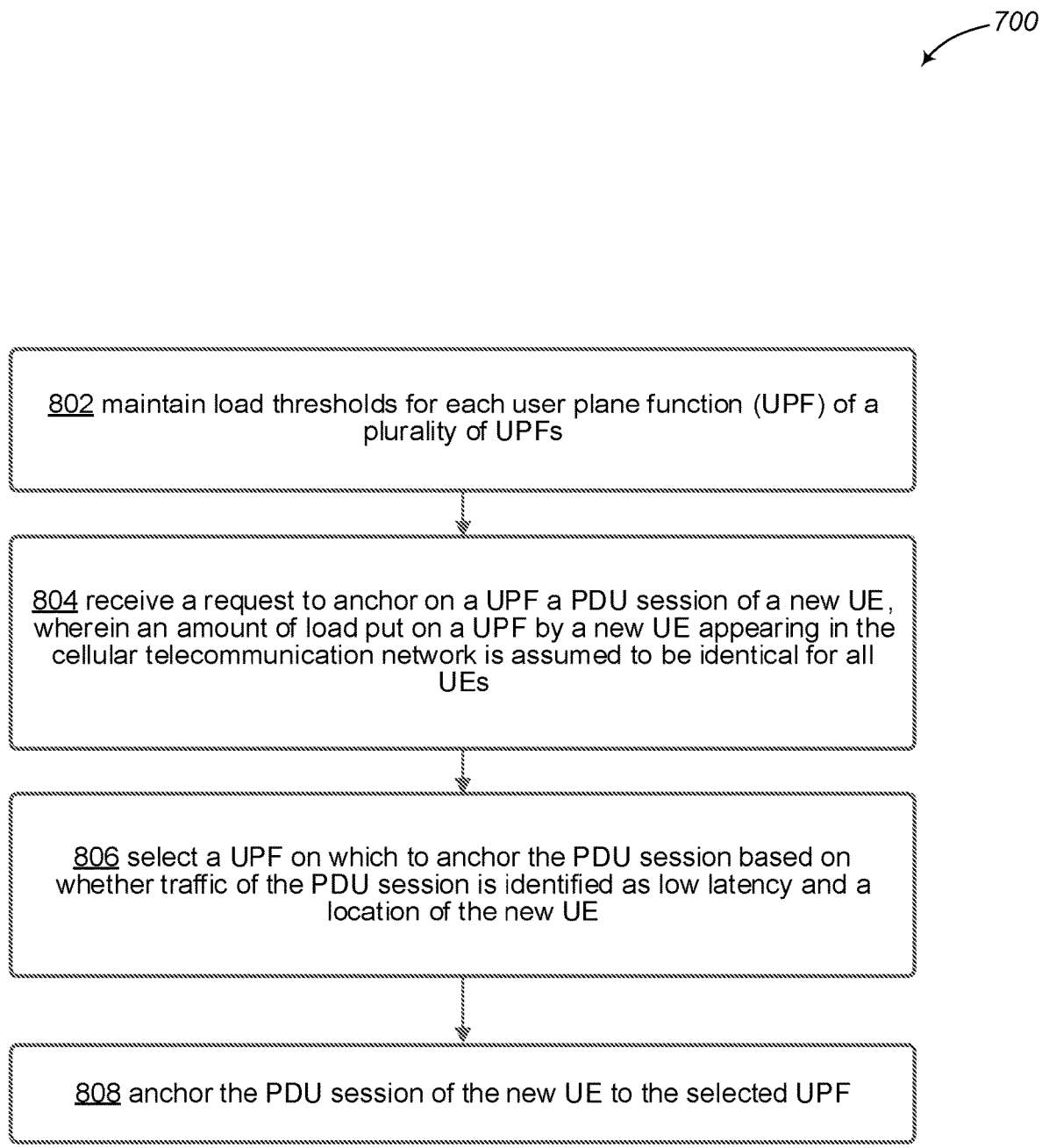
FIG. 8 illustrates a logical flow diagram showing one embodiment of a process for UPF load balancing based on special considerations for low latency traffic in accordance with embodiments described herein.

FIG. 8 illustrates a logical flow diagram showing one embodiment of a process 800 for UPF load balancing based on special considerations for low latency traffic in accordance with embodiments described herein.

At 802, the SMF 102 maintains load thresholds for each user plane function (UPF) of a plurality of UPFs in a cellular telecommunication network. The plurality of UPFs serve as anchor points between UE in the cellular telecommunication network and a DN. Each UPF of the plurality of UPFs is a virtual network function responsible for interconnecting PDU sessions between the UE and the DN by anchoring PDU sessions on individual UPFs. The load thresholds for each UPF depend on a respective capacity of each UPF to have PDU sessions anchored thereon. In the present example embodiment, an amount of load put on a UPF by a UE appearing in the cellular telecommunication network is assumed to be identical for all UEs appearing in the cellular telecommunication network.

In some embodiments, the load thresholds may be reduced by a percentage amount of capacity dedicated for low-latency network traffic. For example, a percentage amount of capacity dedicated for low-latency network traffic may be 10% and thus the load thresholds for non-low latency traffic (such as the thresholds maintained in the process 200 of FIG. 2) may be reduced by 10%.

At 804, the SMF 102 receives a request to anchor on a UPF a PDU session of a new UE newly appearing on the cellular telecommunication network.

At 806, the SMF 102 selects a UPF of the plurality of UPFs on which to anchor the PDU session based on whether traffic of the PDU session is identified as low latency and a location of the new UE.

At 808, the SMF 102 anchors the PDU session of the new UE to the selected UPF.

Figure 9:
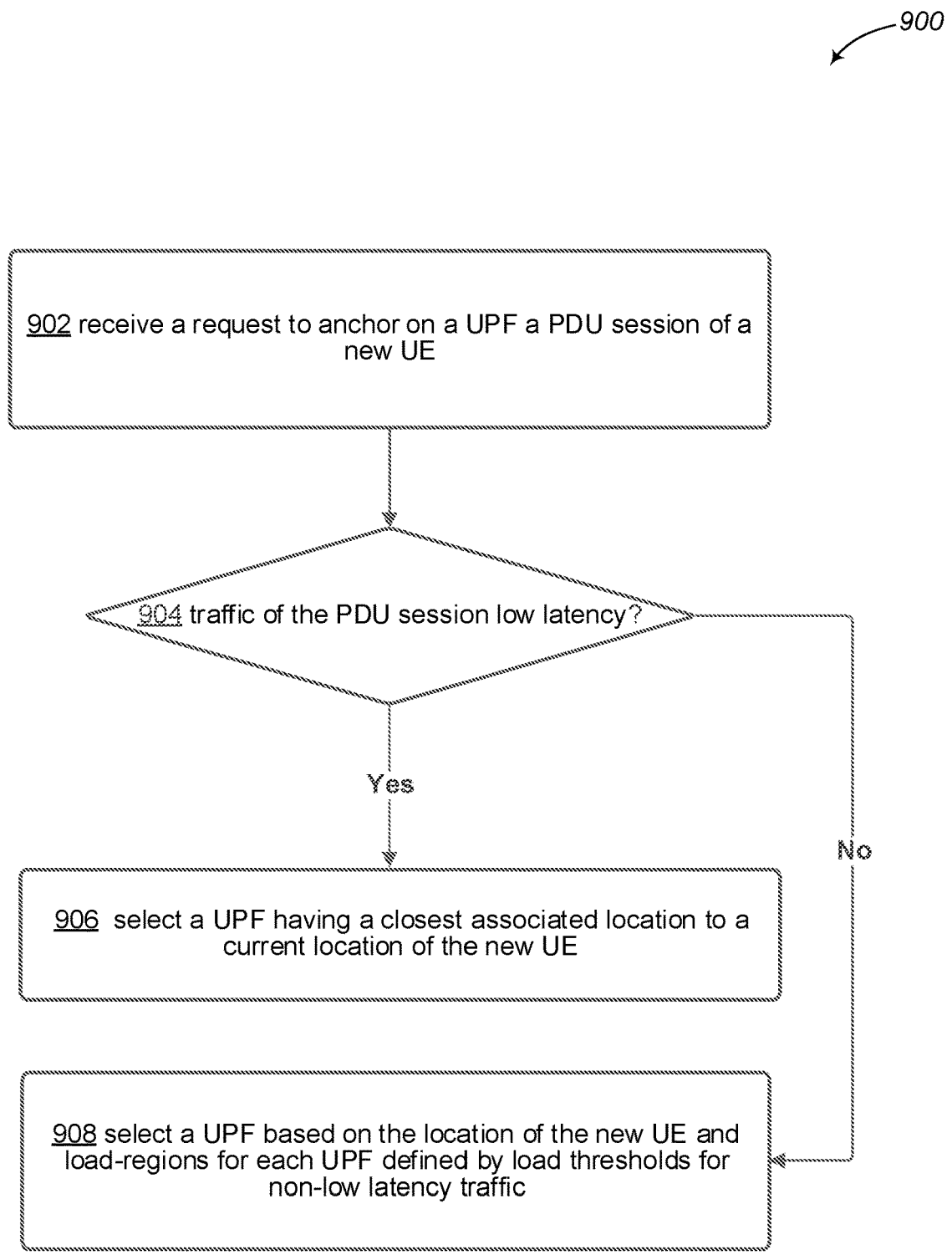
FIG. 9 illustrates a logical flow diagram showing one embodiment of a process for selecting the UPF based on the location of the new UE and load-regions for each UPF defined by load thresholds for non-low latency traffic, which is useful in the process of FIG. 8 in accordance with embodiments described herein.

FIG. 9 illustrates a logical flow diagram showing one embodiment of a process 900 for selecting the UPF based on the location of the new UE and load-regions for each UPF defined by load thresholds for non-low latency traffic, which is useful in the process 800 of FIG. 8 in accordance with embodiments described herein.

At 902, the SMF 102 receives a request to anchor on a UPF a PDU session of a new UE newly appearing on the cellular telecommunication network.

At 904, the SMF 102 determines whether the traffic of the PDU session is identified as low latency. In the present example embodiment, the selection of the UPF is based on dedicating a percentage of capacity of each UPF of the plurality of UPFs to low-latency traffic of PDU sessions. Latency may be measured in the time elapsed from when the client sends the first byte of a request to the moment the server receives it, or it may be measured by the total journey time for a packet to travel to the server and then back to the client. In the present example, on the downlink, the latency is measured from the time that the UPF receives the packet until the time that the packet is delivered to the UE. On the uplink, the latency is measured from the time that the UE sends the packet until the time that the packet is received by the UPF. For example, low latency network traffic may support operations that require near real-time access to rapidly changing data. Low latency is desirable in a wide range of use cases. In a general sense, lower latency is nearly always an improvement over slower packet transport. Low latency is desirable in online gaming as it contributes to a more realistic gaming environment. The term low latency is often used to describe specific business use cases, in particular high-frequency trading in capital markets. If traffic of the PDU session is identified as low latency, then the process 900 proceeds to 906. If traffic of the PDU session is not identified as low latency, then the process 900 proceeds to 908.

At 906, the SMF 102 selects a UPF having a closest associated location to a current location of the new UE.

At 908, the SMF selects a UPF based on the location of the new UE and load-regions for each UPF of the plurality of UPFs defined by the load thresholds for non-low latency traffic.

Figure 10:
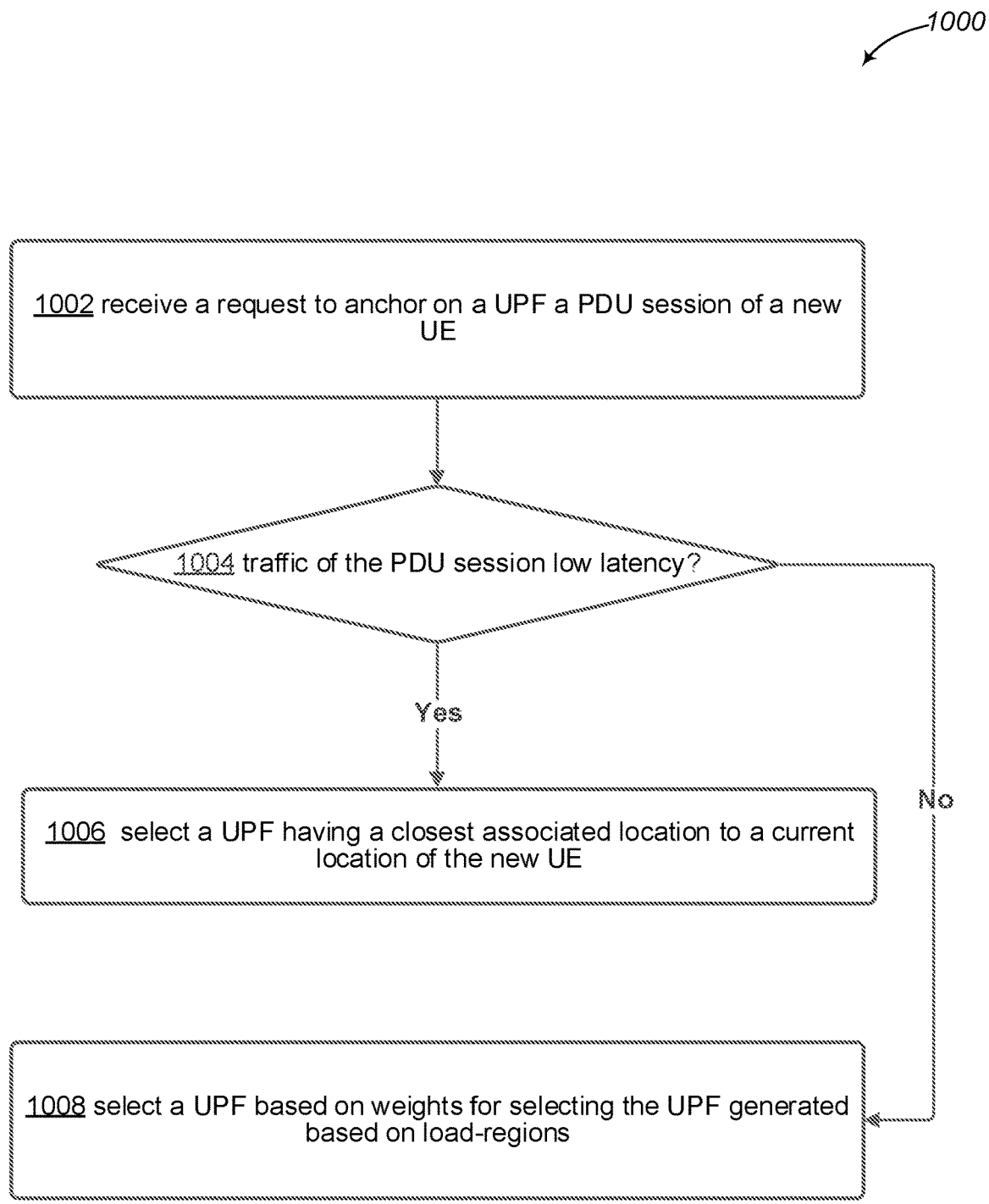
FIG. 10 illustrates a logical flow diagram showing one embodiment of a process for selecting the UPF based on whether the network traffic is identified as low latency, which is useful in the process of FIG. 9 in accordance with embodiments described herein.

FIG. 10 illustrates a logical flow diagram showing one embodiment of a process 1000 for selecting the UPF based on whether the network traffic is identified as low latency, which is useful in the process 900 of FIG. 9 in accordance with embodiments described herein.

At 1002, the SMF 102 receives a request to anchor on a UPF a PDU session of a new UE newly appearing on the cellular telecommunication network.

At 1004, the SMF 102 determines whether the traffic of the PDU session is identified as low latency. If traffic of the PDU session is identified as low latency, then the process 1000 proceeds to 1006. If traffic of the PDU session is not identified as low latency, then the process 1000 proceeds to 1008.

At 1006, the SMF 102 selects a UPF having a closest associated location to a current location of the new UE.

At 1008, the SMF 102 selects a UPF based on weights for selecting the UPF generated based on the load-regions, wherein each load-region corresponds to a different range of current load of the UPF defined by one or more of lower and upper threshold percentages of load capacity of the UPF.

In some embodiments, if each UPF of the plurality of UPFs is identified as currently having a current load falling within a low load-region defined by a current load below a particular threshold, then the SMF 102 selects a UPF having a closest associated location to a current location of the new UE.

Figure 11:
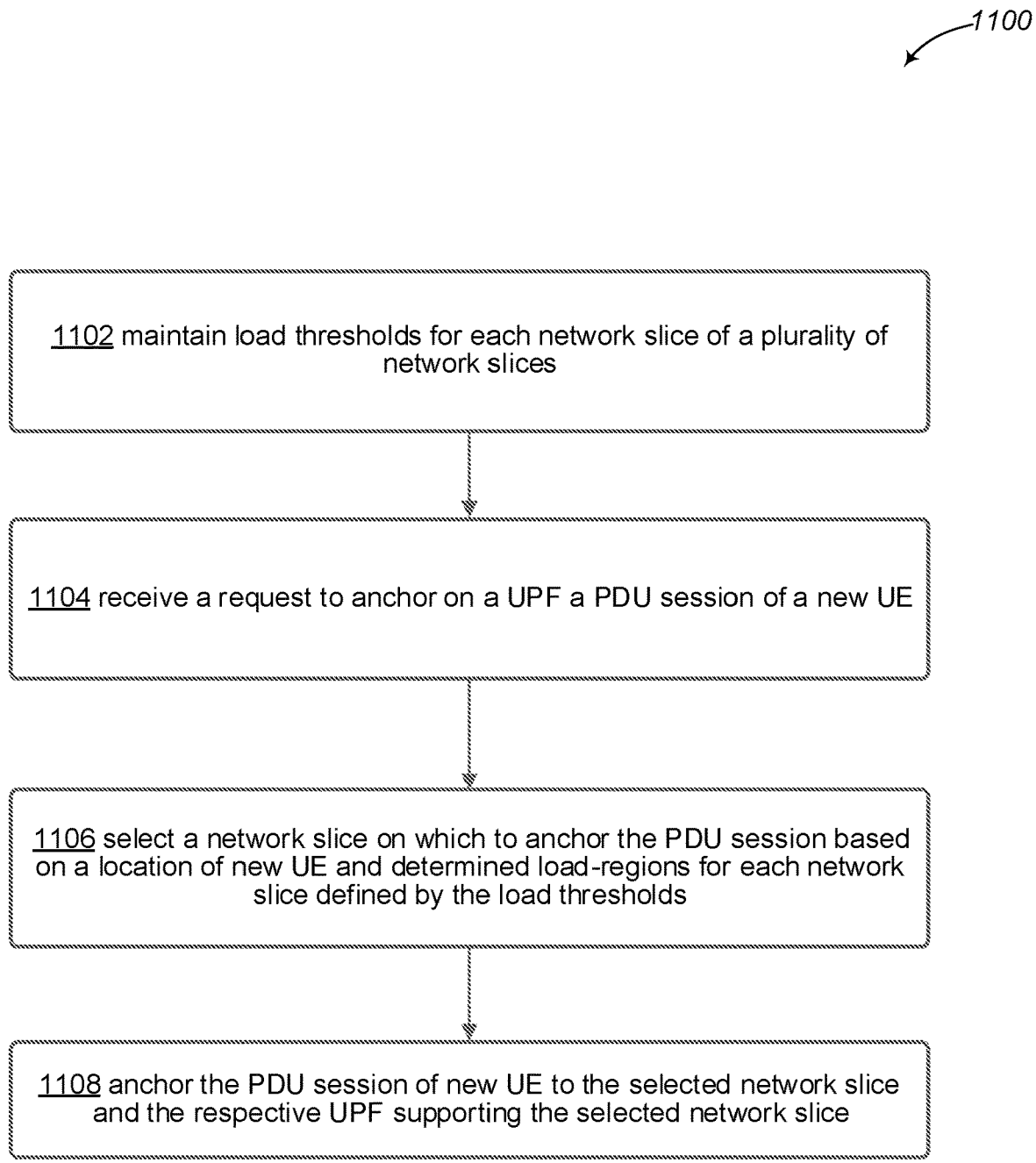
FIG. 11 illustrates a logical flow diagram showing one embodiment of a process for UPF load balancing supporting multiple slices, maintaining several load-thresholds for each UPF and each slice depending on the UPF and network slice capacity in accordance with embodiments described herein.

FIG. 11 illustrates a logical flow diagram showing one embodiment of a process 1100 for UPF load balancing supporting multiple slices, maintaining several load-thresholds for each UPF and each slice depending on the UPF and network slice capacity in accordance with embodiments described herein.

At 1102, the SMF 102 maintains load thresholds for each network slice of a plurality of network slices. In the present example embodiment, each network slice of each respective set of network slices comprises of a set of virtual network resources and network traffic flows associated with the network slice and represents an independent virtualized instance of a network defined by allocation of a subset of available network resources in the cellular telecommunication network. Each network slice of the plurality of network slices is supported by a respective user plane function (UPF) of a plurality of UPFs in a cellular telecommunication network. The plurality of UPFs serve as anchor points between user equipment (UE) in the cellular telecommunication network and a data network (DN). Each UPF of the plurality of UPFs is a virtual network function responsible for interconnecting packet data unit (PDU) sessions between the user equipment (UE) and the DN by anchoring the PDU sessions on individual UPFs. The load thresholds for each network slice depend on a respective capacity of each network slice and total capacity of each UPF supporting each network slice to have PDU sessions anchored thereon. An amount of load put on a network slice by a UE appearing in the cellular telecommunication network is assumed to be identical for all UEs appearing in the cellular telecommunication network.

At 1104, the SMF 102 receives a request to anchor on a UPF a PDU session of a new UE newly appearing on the cellular telecommunication network.

At 1106, the SMF 102 selects a network slice of the plurality of network slices on which to anchor the PDU session based on a location of the new UE and determined load-regions for each network slice of the plurality of network slices defined by the load thresholds.

At 1108, the SMF 102 anchors the PDU session of the new UE to the selected network slice and the respective UPF supporting the selected network slice.

Figure 12:
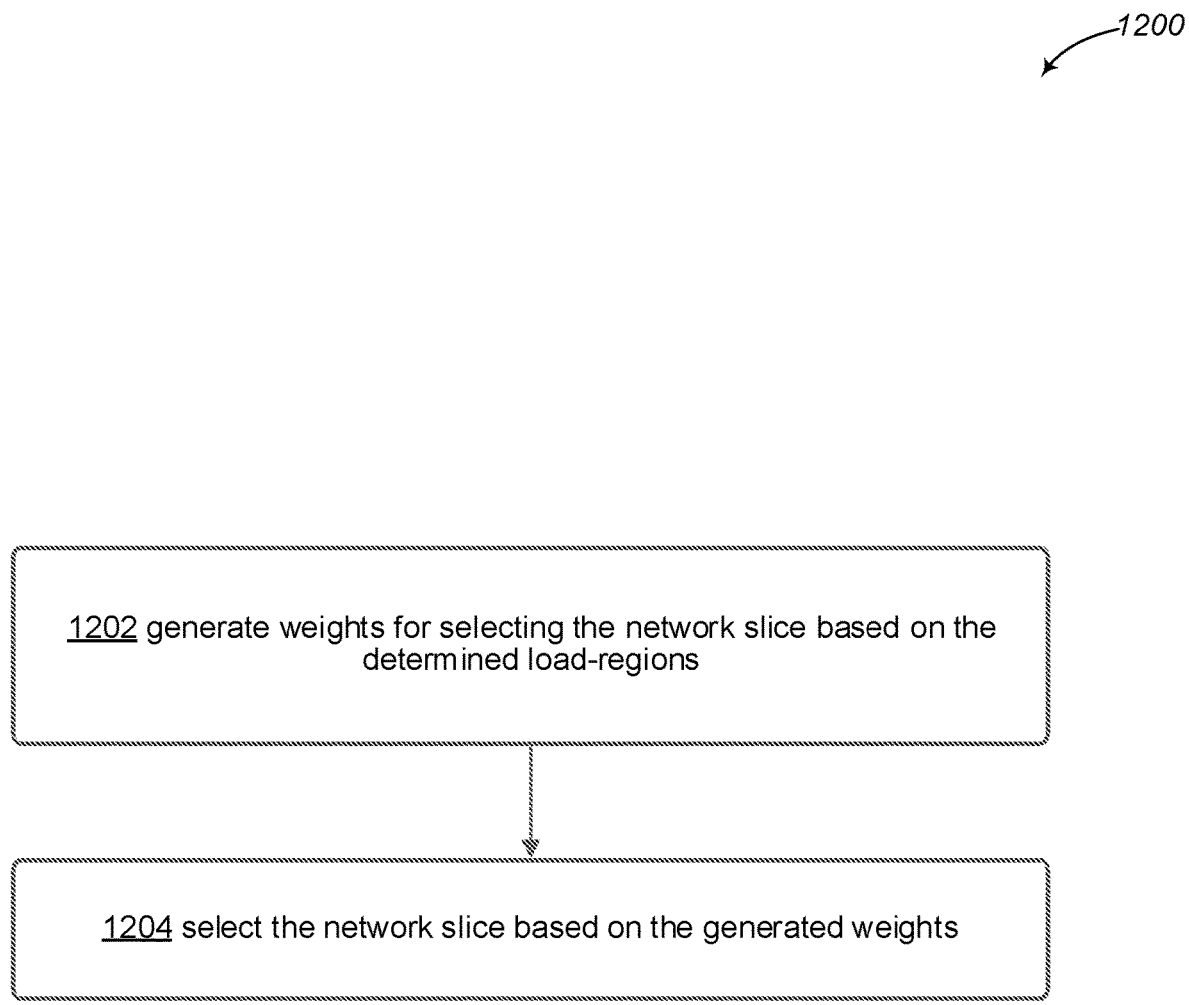
FIG. 12 illustrates a logical flow diagram showing one embodiment of a process for selecting the network slice based on generated weights, which is useful in the process of FIG. 11 in accordance with embodiments described herein.

FIG. 12 illustrates a logical flow diagram showing one embodiment of a process 1200 for selecting the network slice based on generated weights, which is useful in the process 1100 of FIG. 11 in accordance with embodiments described herein.

At 1202, the SMF 102 generates weights for selecting the network slice based on the determined load-regions.

At 1204, the SMF 102 selects the network slice based on the generated weights.

Figure 13:
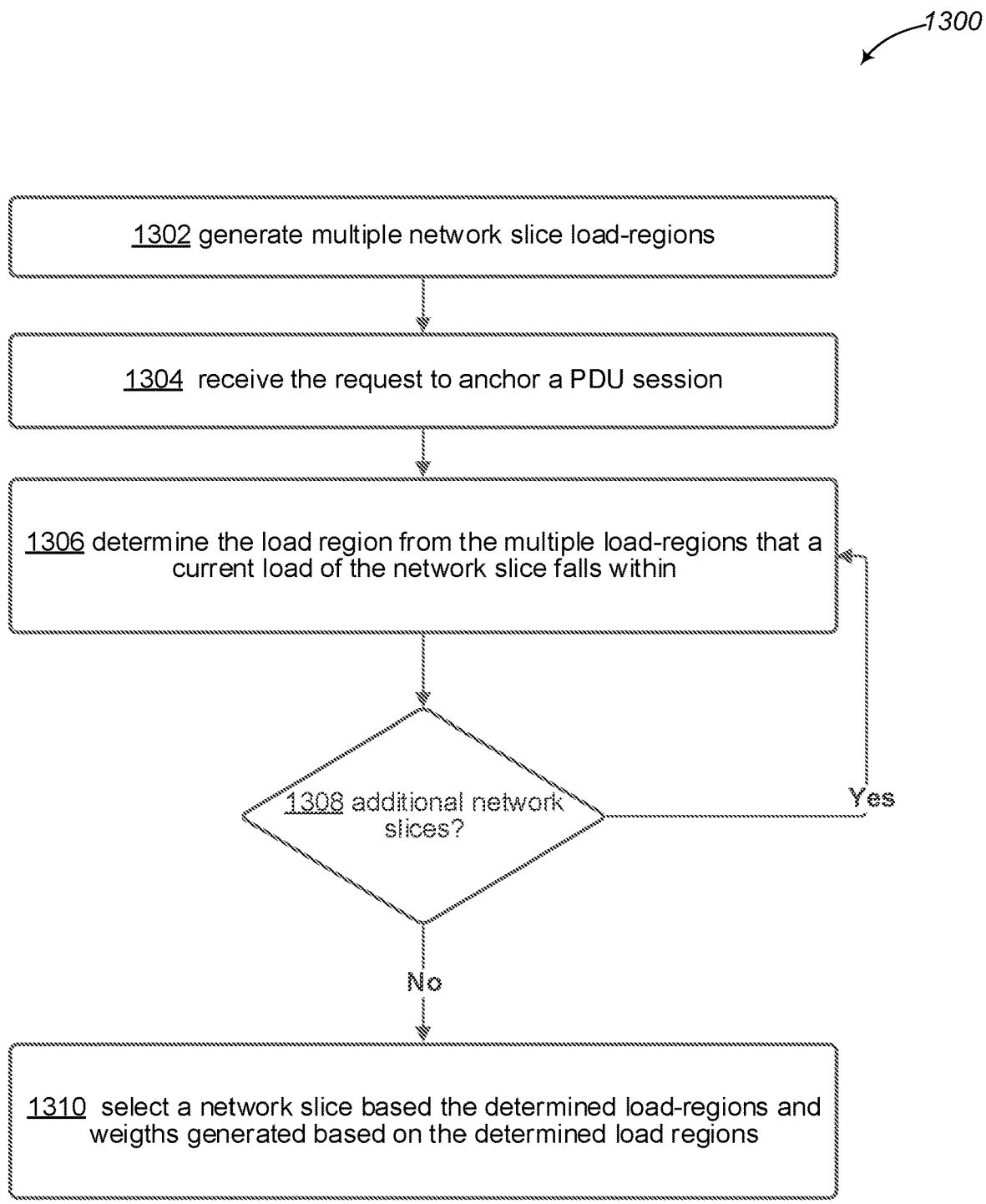
FIG. 13 illustrates a logical flow diagram showing one embodiment of a process for selecting the network slice based on determined load-regions for each slice and weights generated based on the determined load regions, which is useful in the process of FIG. 12 in accordance with embodiments described herein.

FIG. 13 illustrates a logical flow diagram showing one embodiment of a process 1300 for selecting the network slice based on determined load-regions for each slice and weights generated based on the determined load regions, which is useful in the process 1200 of FIG. 12 in accordance with embodiments described herein.

At 1302, the SMF 102 generates multiple load-regions. Each load-region corresponds to a different range of current load of a network slice defined by one or more of lower and upper threshold percentages of network slice load capacity. For example, in one embodiment, the SMF 102 may generate a lowest load-region indicating a current network slice load less than a first threshold percentage of network slice capacity; generate one or more intermediate non-overlapping load-regions each defined by respective lower and upper threshold percentages of network slice capacity and indicating a current load greater than the lowest load-region; and generate a highest load-region indicating a current network slice load greater than a second threshold percentage of network slice capacity and greater than the intermediate load-region(s).

At 1304, the SMF 102 receives the request to anchor the PDU session.

At 1306, the SMF 102, in response to receiving the request to anchor the PDU session, determines a load region from the multiple load-regions that a current load of a network slice falls within.

At 1306, the SMF 102 determines whether there are any additional network slides on which the PDU session may be anchored. If it is determined there are additional network slides on which the PDU session may be anchored, then process 1300 proceeds back to 1306 to determine a load region from the multiple load-regions that a current load of the additional network slice falls within. If it is determined there are not additional network slides on which the PDU session may be anchored, then the process 1300 proceeds to 1310.

At 1310, the SMF 102 selects a network slice of the plurality of network slices based on the determined load-regions for the plurality of network slices and the weights generated based on the determined load regions. In some embodiments, each network slice of the plurality of network slices is associated with a respective geographic area of the respective UPF supporting the network slice (i.e., the geographic area of the data center of the UPF). Selecting a network slice based on the generated weights and the determined load-regions for the plurality of network slices may include determining a particular network slice of the plurality of network slices is associated with a respective geographic area within which the location of the new UE falls. The SMF 102 may then select the particular network slice in response the determined load-region of the particular network slice being a load-region indicating a current load of the particular network slice is below a threshold capacity.

In some embodiments, selecting a network slice based on the generated weights and the determined load-regions for the plurality of network slices may include determining whether the particular network slice has a determined load region indicating a current load of the particular network slice is in a different load region indicating a higher current load of the particular network slice than a current load of another network slice. In response to this, the SMF 102 may weight the selection of a network slice of the plurality of network slices such that the particular network slice is not overloaded compared to the other network slice by using credit/token-based weighted scheduling or probability-based weighted scheduling.

In some embodiments, the selection of a network slice includes determining a particular network slice of the plurality of network slices is associated with a respective geographic area within which the location of the new UE falls. The selection of the network slice is then weighted by using credit/token-based weighted scheduling or probability-based weighted scheduling such that the frequency of selection of the particular network slice decreases as a difference between a higher current load of the particular network slice and a lower current load of at least one network slice of the plurality of network slices increases, as indicated by the load regions determined for each network slice of the plurality of network slices.

Figure 14:
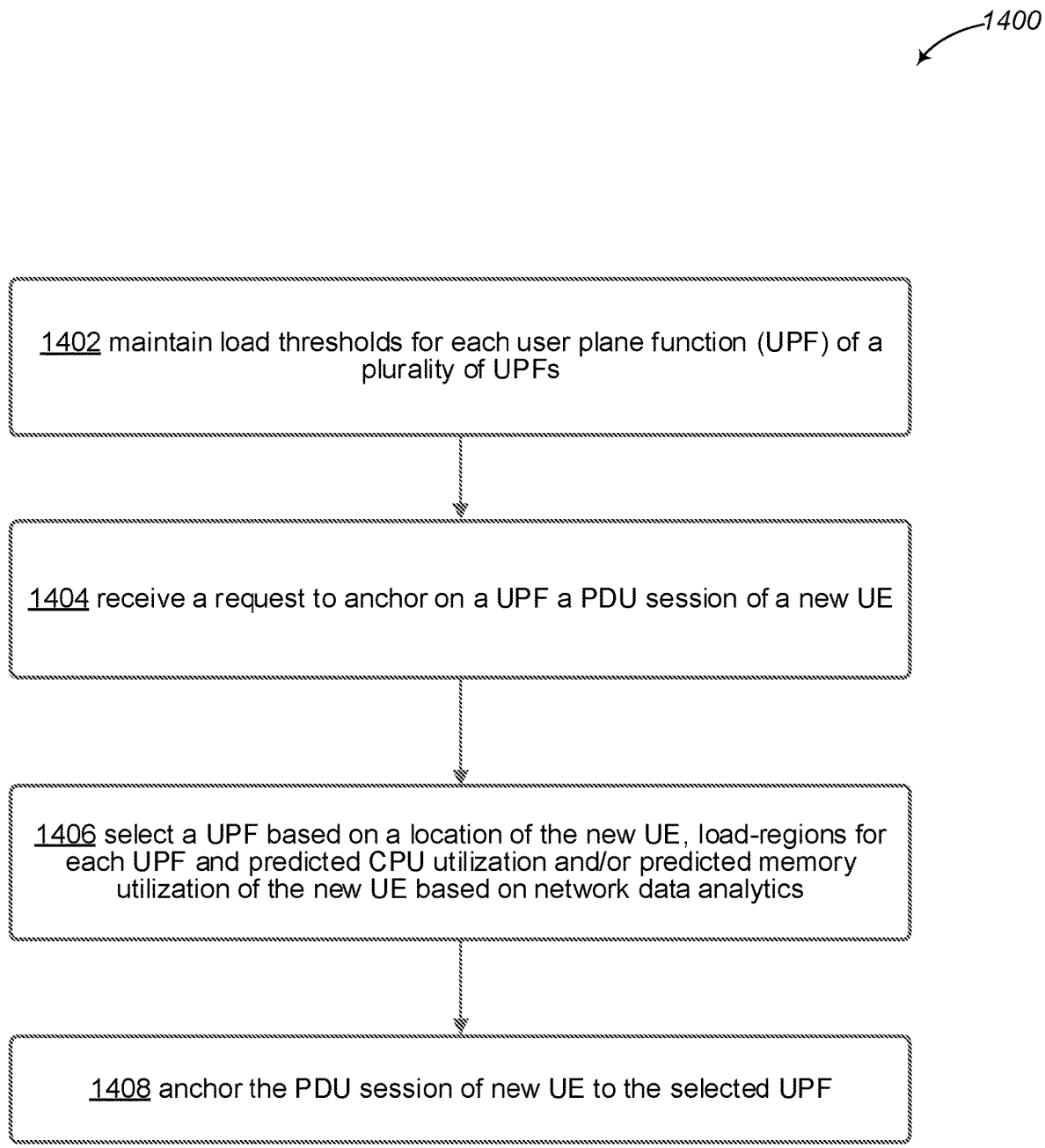
FIG. 14 illustrates a logical flow diagram showing one embodiment of a process for UPF load balancing using predicted central processing unit (CPU) utilization and/or predicted memory utilization of new user equipment (UE) on the network based on network data analytics in accordance with embodiments described herein.

FIG. 14 illustrates a logical flow diagram showing one embodiment of a process 1400 for UPF load balancing using predicted CPU utilization and/or predicted memory utilization of new UE on the network based on network data analytics in accordance with embodiments described herein.

At 1402, the SMF 102 maintains load thresholds for each UPF of a plurality of UPFs in a cellular telecommunication network. The plurality of UPFs serve as anchor points between UE in the cellular telecommunication network and a DN. Each UPF of the plurality of UPFs is a virtual network function responsible for interconnecting PDU sessions between the UE and the DN by anchoring the PDU sessions on individual UPFs. The load thresholds for each UPF depend on a respective capacity of each UPF to have PDU sessions anchored thereon.

At 1404, the SMF 102 receives a request to anchor on a UPF a PDU session of a new UE newly appearing on the cellular telecommunication network.

At 1406, the SMF 102 selects a UPF of the plurality of UPFs on which to anchor the PDU session based on a location of the new UE, load-regions for each UPF of the plurality of UPFs defined by the load thresholds and one or more of predicted CPU utilization and predicted memory utilization of the new UE based on network data analytics. In some embodiments, the network data analytics may be provided via an NWDAF of a 5G mobile network of which the cellular telecommunication network is comprised.

Figure 15:
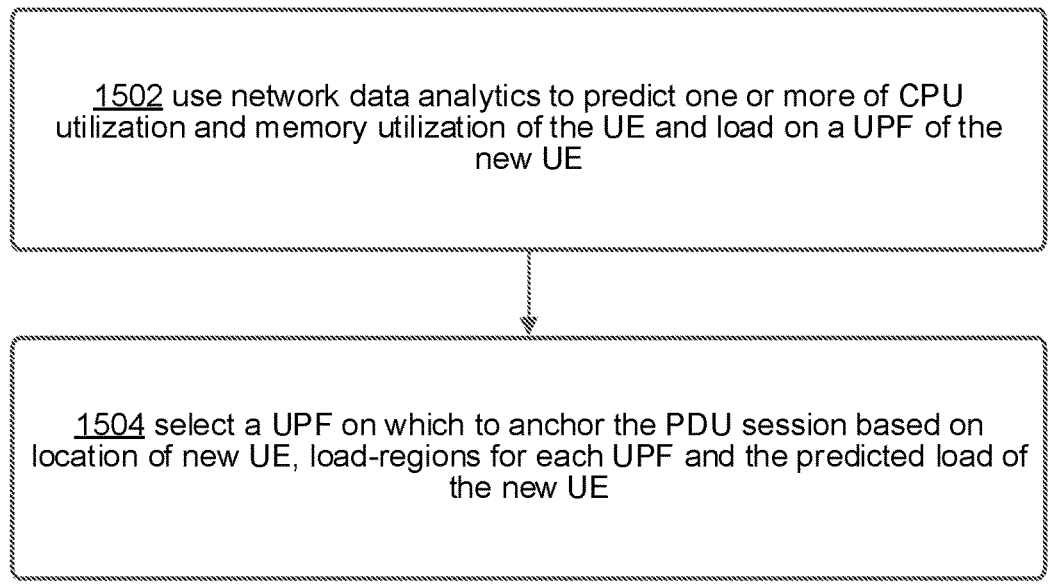
FIG. 15 illustrates a logical flow diagram showing one embodiment of a process for selecting the UPF, which is useful in the process of FIG. 14 in accordance with embodiments described herein.

FIG. 15 illustrates a logical flow diagram showing one embodiment of a process 1500 for selecting the UPF, which is useful in the process 1400 of FIG. 14 in accordance with embodiments described herein.

At 1502, the SMF 102 uses the network data analytics to predict one or more of CPU utilization and memory utilization of the UE and load on a UPF of the new UE appearing on the cellular telecommunication network based on one or more of the predicted CPU utilization and predicted memory utilization.

At 1504, the SMF 102 selects a UPF of the plurality of UPFs on which to anchor the PDU session based on a location of the new UE, load-regions for each UPF of the plurality of UPFs defined by the load thresholds and the predicted load of the new UE on a UPF.

FIG. 16 illustrates a logical flow diagram showing one embodiment of a process for 1600 selecting the UPF using AI or machine learning ML algorithms to perform predictive analysis of CPU utilization and/or predicted memory utilization, which is useful in the process 1500 of FIG. 15 in accordance with embodiments described herein.

At 1602, the SMF 102 uses artificial intelligence (AI) or machine learning (ML) algorithms to perform predictive analysis of one or more of CPU utilization and memory utilization of the new UE and resulting load on a UPF of the new UE appearing on the cellular telecommunication network based on historical activity of the new UE appearing on the cellular telecommunication network.

At 1604, the SMF 102 implements a weighted scheduling of load on UPFs to achieve UPF load-balancing based on one or more of the predicted CPU utilization and predicted memory utilization of the new UE and resulting predicted load on a UPF of the new UE. This weighted scheduling can be implemented using credit/token based scheduling algorithms or statistical based scheduling algorithms (using probability). For example, in one embodiment, the SMF 102 may increase a probability that a particular UPF will be selected in response to a current load of the particular UPF being currently in a particular load-region as compared to other UPFs of the plurality of UPFs and the resulting predicted load resulting from one or more of the predicted CPU utilization and predicted memory utilization being at a particular level. The SMF 102 may decrease a probability that the particular UPF in the plurality of UPFs will be overloaded beyond a threshold amount compared to other UPFs in the plurality of UPFs based on the resulting predicted load by changing the probability of whether the particular UPF will be selected based on the resulting predicted load resulting from one or more of the predicted CPU utilization and predicted memory utilization. Such load balancing may instead be achieved using credit/token based scheduling (e.g., weighted round robin).

FIG. 17 illustrates a chart 1700 showing an example of possible load-regions that a current load of a UPF may be determined to fall within that may be used in the processes of FIGS. 2-7 and 15-17 in accordance with embodiments described herein.

The chart 1700 indicates the load region 1702 and the range of percentage of total load capacity 1704 for each load-region 1702 defined by respective load thresholds indicated in the chart 1700. In the present example, the "Low" load region indicates a current UPF load of less than 30% of the total load capacity. The "Medium" load region indicates a current UPF load of greater than or equal to 30% and less than 55% of the total load capacity. The "High" load region indicates a current UPF load of greater than or equal to 55% and less than 75% of the total load capacity. The "Very High" load region indicates a current UPF load of greater than or equal to 75% of the total load capacity. There may be additional or different load regions in various other embodiments. The chart 1700 may be stored or represented as a data structure in computer memory and may be maintained and/or accessible by the SMF 102.

Figure 18:
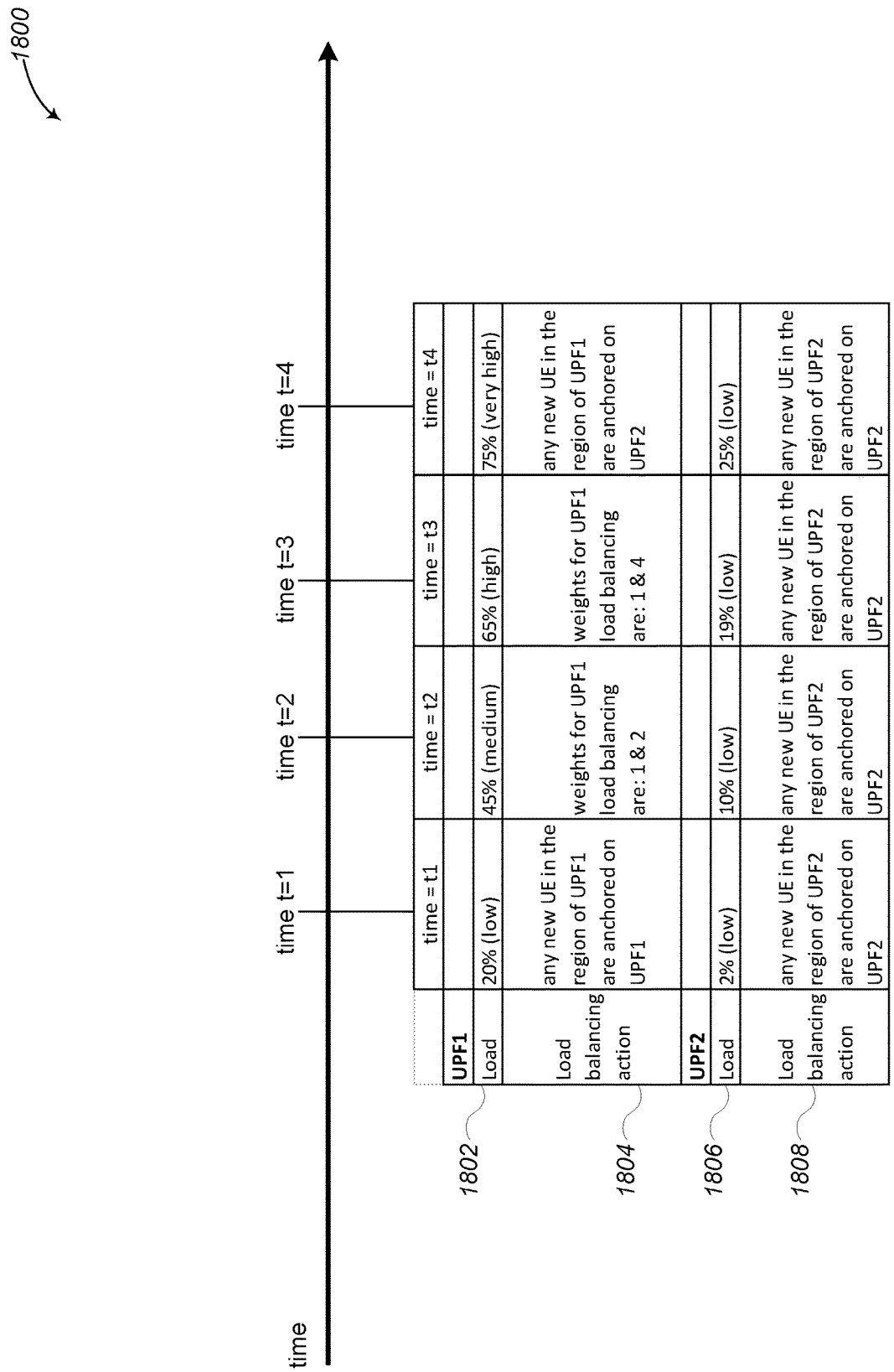
FIG. 18 illustrates a timeline showing an example of possible UPF load balancing that may occur according to the processes of FIGS. 2-4 with two UPFs determined to fall within particular different load-regions of those shown in FIG. 17 at particular times in accordance with embodiments described herein.

FIG. 18 illustrates a timeline 1800 showing an example of possible UPF load balancing that may occur according to the processes of FIGS. 2-4 with two UPFs determined to fall within particular different load-regions of those shown in the chart 1700 FIG. 17 at particular times in accordance with embodiments described herein.

For each example point in time t=1, t=2, t=3 and t=4, shown in the timeline 1800 is the determined UPF1 load 1802, the determined UPF2 load 1806 and the corresponding UPF1 load balancing action 1804 and UPF2 load balancing action 1808.

Referring now also to FIG. 1, in the present example, at time t=1, the SMF 102 determines that the current load of UPF1 104 is 20% of the total load capacity for UPF1 104 and thus determines the load region or UPF1 104 is "low" based on the load thresholds in the chart 1700 of FIG. 17. At time t=1, the SMF 102 also determines that the current load of UPF2 106 is 2% of the total load capacity for UPF2 106 and thus determines the load region or UPF2 106 is also "low" based on the load thresholds in the chart 1700 of FIG. 17. Based on the determined load regions for UPF1 104 and UPF2 106, any new UE in the region of UPF1 104 (e.g., the region of UPF1 104 being a respective geographic area associated with data center 1) are anchored on UPF1 104 and any new UE in the region of UPF2 106 (e.g., the region of UPF2 106 being a respective geographic area associated with data center 2) are anchored on UPF2 106.

At time t=2, the SMF 102 determines that the current load of UPF1 104 is 45% of the total load capacity for UPF1 104 and thus determines the load region or UPF1 104 is "medium" based on the load thresholds in the chart 1700 of FIG. 17. At time t=2, the SMF 102 also determines that the current load of UPF2 106 is 10% of the total load capacity for UPF2 106 and thus determines the load region or UPF2 106 is "low" based on the load thresholds in the chart 1700 of FIG. 17. Based on the determined load regions for UPF1 104 and UPF2 106, the weights determined by the SMF 102 for UPF1 104 load balancing are 1 & 2. In particular, for every three new UEs in the region of UPF1 104 (data center 1), one is anchored on UPF1 104 and the other two are anchored on UPF2 106. In various embodiments, the load balancing can be done using credit/token based scheduling algorithms (using weighted round robin) or done randomly (using statistical based scheduling algorithms using probability): with probability 1/3 a new UE is anchored on UPF1 104 and with probability 2/3 the new UE is anchored on UPF2 106. Any new UE in the region of UPF2 106 are anchored on UPF2 106 (data center 2).

At time t=3, the SMF 102 determines that the current load of UPF1 104 is 65% of the total load capacity for UPF1 104 and thus determines the load region or UPF1 104 is "high" based on the load thresholds in the chart 1700 of FIG. 17. At time t=3, the SMF 102 also determines that the current load of UPF2 106 is 19% of the total load capacity for UPF2 106 and thus determines the load region or UPF2 106 is "low" based on the load thresholds in the chart 1700 of FIG. 17. Based on the determined load regions for UPF1 104 and UPF2 106, the weights determined by the SMF 102 for UPF1 104 load balancing are 1 & 4. In particular for every five new UEs in the region of UPF1 (data center1), one is anchored on UPF1 and the other four are anchored on UPF2. In various embodiments, the load balancing can be done by the SMF 102 using weighted round robin or done randomly, with probability 1/5 a new UE is anchored on UPF1 and with probability 4/5 the new UE is anchored on UPF2). Any new UE in the region of UPF2 106 (e.g., the region of UPF2 106 being a respective geographic area associated with data center 2) are anchored on UPF2 106 (data center 2).

At time t=4, the SMF 102 determines that the current load of UPF1 104 is 75% of the total load capacity for UPF1 104 and thus determines the load region or UPF1 104 is "very high" based on the load thresholds in the chart 1700 of FIG. 17. At time t=4, the SMF 102 also determines that the current load of UPF2 106 is 25% of the total load capacity for UPF2 106 and thus determines the load region or UPF2 106 is "low" based on the load thresholds in the chart 1700 of FIG. 17. Based on the determined load regions for UPF1 104 and UPF2 106, any new UE in the region of UPF1 104 (data center 1) are anchored on UPF2 106 and any new UE in the region of UPF2 106 (data center 2) are also anchored on UPF2 106. In some embodiments, the credit based scheduling method, such as the weighted round robin scheduling, disclosed herein is based on a probabilistic model. Alternatively, a credit/token based weighted round robin scheduling can be used in various other embodiments.

Figure 19:
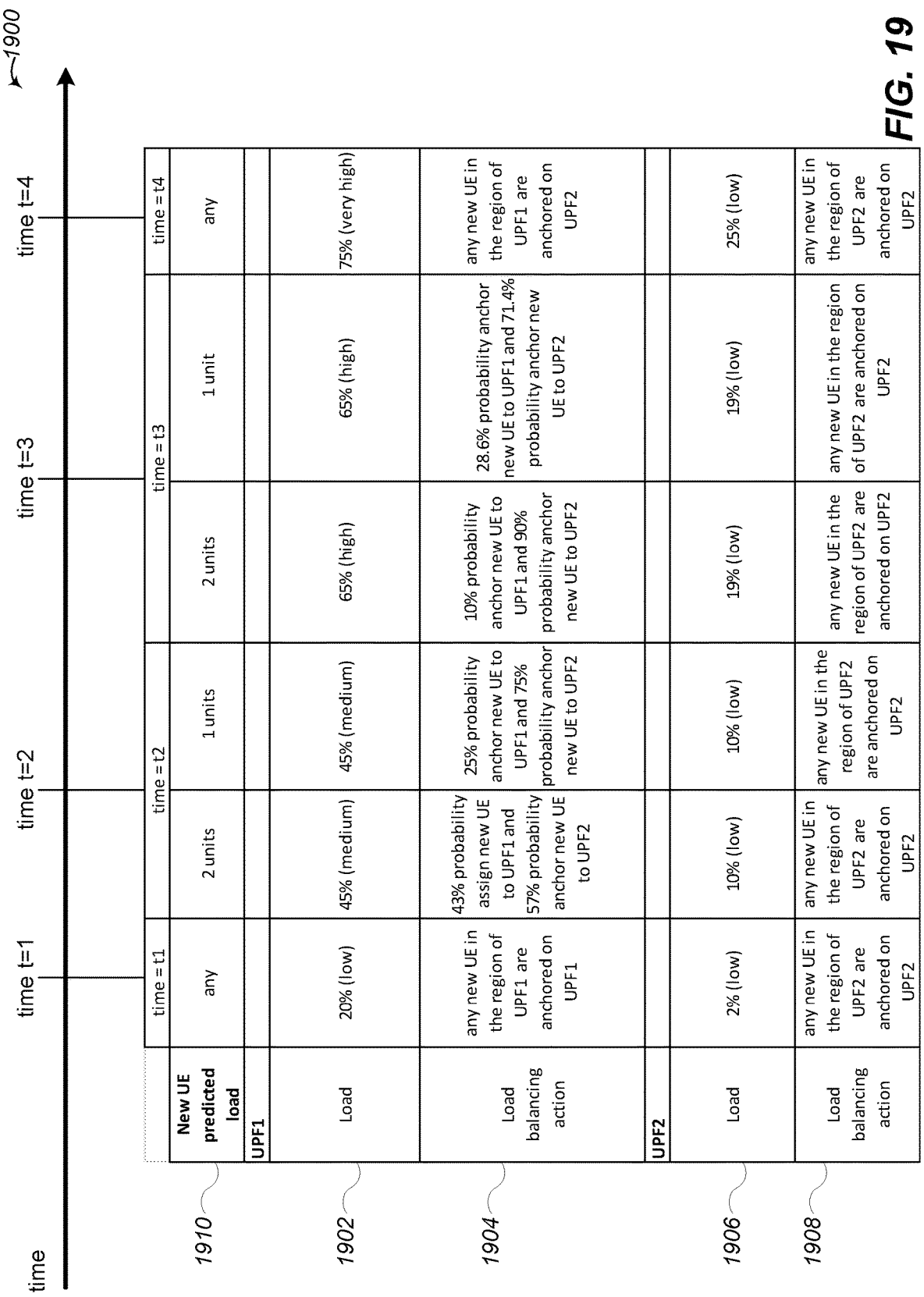
FIG. 19 illustrates a timeline showing an example of possible UPF load balancing that may occur according to the processes of FIGS. 5-7 with two UPFs determined to fall within particular different load-regions of those shown in FIG. 17 at particular times in accordance with embodiments described herein.

FIG. 19 illustrates a timeline showing an example of possible UPF load balancing that may occur according to the processes of FIGS. 5-7 with two UPFs determined to fall within particular different load-regions of those shown in FIG. 17 at particular times in accordance with embodiments described herein.

For each example point in time t=1, t=2, t=3 and t=4, shown in the timeline 1900 is the determined UPF1 load 1902, the determined UPF2 load 1906, the corresponding UPF1 load balancing action 1904 and UPF2 load balancing action 1908, as well as example new UE predicted loads 1910. For example, the predicted load may be based on data from the network data analytics function (NWDAF). The predicted load may be measured in units based on throughput (e.g., packets per second, bytes per second, and/or bits per second), CPU utilization (e.g., CPU clock cycles, clock ticks, CPU time, CPU time per second, process time, percentage of CPU capacity utilization) and/or memory utilization, (megabytes of memory, and/or percentage of memory capacity utilization) or any combination thereof.

Referring now also to FIG. 1, in the present example, at time t=1, the SMF 102 determines that the current load of UPF1 104 is 20% of the total load capacity for UPF1 104 and thus determines the load region or UPF1 104 is "low" based on the load thresholds in the chart 1700 of FIG. 17. At time t=1, the SMF 102 also determines that the current load of UPF2 106 is 2% of the total load capacity for UPF2 106 and thus determines the load region or UPF2 106 is also "low" based on the load thresholds in the chart 1700 of FIG. 17. In this case, based on the determined load regions for UPF1 104 and UPF2 106, regardless of any predicted load of the new UE, any new UE in the region of UPF1 104 (data center 1) are anchored on UPF1 104 and any new UE in the region of UPF2 106 (data center 2) are anchored on UPF2 106.

At time t=2, the SMF 102 determines that the current load of UPF1 104 is 45% of the total load capacity for UPF1 104 and thus determines the load region or UPF1 104 is "medium" based on the load thresholds in the chart 1700 of FIG. 17. At time t=2, the SMF 102 also determines that the current load of UPF2 106 is 10% of the total load capacity for UPF2 106, and thus determines the load region or UPF2 106 is "low" based on the load thresholds in the chart 1700 of FIG. 17. Based on the determined load regions for UPF1 104 and UPF2 106, the weights determined by the SMF 102 for UPF1 104 load balancing are 1 & 2. For example, based on the detected predicted load of the new UE appearing on the network, if the SMF 102 determines that the predicted load of the new UE is 2 units of load, the SMF 102 will perform load balancing such that there is a 43% probability the SMF 102 anchors the UE to UPF1 104 and a 57% probability the SMF 102 anchors the UE to UPF2 106. If the SMF 102 determines that the predicted load of the new UE is 1 unit of load, the SMF 102 will perform load balancing such that there is a 25% probability the SMF 102 anchors the UE to UPF1 104 and a 75% probability the SMF 102 anchors the UE to UPF2 106. Any new UE in the region of UPF2 (data center 2) 106 are anchored on UPF2 106.

At time t=3, the SMF 102 determines that the current load of UPF1 104 is 65% of the total load capacity for UPF1 104 and thus determines the load region or UPF1 104 is "high" based on the load thresholds in the chart 1700 of FIG. 17. At time t=3, the SMF 102 also determines that the current load of UPF2 106 is 19% of the total load capacity for UPF2 106 and thus determines the load region or UPF2 106 is "low" based on the load thresholds in the chart 1700 of FIG. 17. Based on the determined load regions for UPF1 104 and UPF2 106, the weights determined by the SMF 102 for UPF1 104 load balancing are 1 & 4. For example, based on the detected predicted load of the new UE appearing on the network, if the SMF 102 determines that the predicted load of the new UE is 2 units of load, the SMF 102 will perform load balancing such that there is a 10% probability the SMF 102 anchors the UE to UPF1 104 and a 90% probability the SMF 102 anchors the UE to UPF2 106. If the SMF 102 determines that the predicted load of the new UE is 1 unit of load, the SMF 102 will perform load balancing such that there is a 28.6% probability the SMF 102 anchors the UE to UPF1 104 and a 71.4% probability the SMF 102 anchors the UE to UPF2 106. Any new UE in the region of UPF2 106 (data center 2) are anchored on UPF2 106.

At time t=4, the SMF 102 determines that the current load of UPF1 104 is 75% of the total load capacity for UPF1 104 and thus determines the load region or UPF1 104 is "very high" based on the load thresholds in the chart 1700 of FIG. 17. At time t=4, the SMF 102 also determines that the current load of UPF2 106 is 25% of the total load capacity for UPF2 106 and thus determines the load region or UPF2 106 is "low" based on the load thresholds in the chart 1700 of FIG. 17. In this case, based on the determined load regions for UPF1 104 and UPF2 106, regardless of any predicted load of the new UE, any new UE in the region of UPF1 104 (data center 1) are anchored on UPF2 106 and any new UE in the region of UPF2 106 (data center 2) are also anchored on UPF2 106.

FIG. 20 illustrates a chart 2000 showing an example of possible load-regions for non-low latency traffic that a current load of a UPF may be determined to fall within that may be used in the processes of FIGS. 8-10 in accordance with embodiments described herein.

The chart 2000 indicates the load region 2002 and the range of percentage of total load capacity 2004 for each load-region 2002 defined by respective load thresholds indicated in the chart 1700. The load-regions shown in the chart 2000 are used for UPF load balancing based on special considerations for low latency traffic. The load thresholds are reduced compared to those of chart 1700 in FIG. 17 by a percentage amount of capacity dedicated for low-latency network traffic. In the present example, the percentage amount of capacity dedicated for low-latency network traffic is 10% and thus the load thresholds for non-low latency traffic are reduced by 10%. In particular, "Low" load region indicates a current UPF load of less than 20% of the total load capacity. The "Medium" load region indicates a current UPF load of greater than or equal to 20% and less than 45% of the total load capacity. The "High" load region indicates a current UPF load of greater than or equal to 45% and less than 65% of the total load capacity. The "Very High" load region indicates a current UPF load of greater than or equal to 65% of the total load capacity. There may be additional or different load regions in various other embodiments. The chart 1700 may be stored or represented as a data structure in computer memory and may be maintained and/or accessible by the SMF 102.

In one embodiment, in performing UPF load balancing based on special considerations for low latency traffic, the SMF 102 may perform such load balancing in the manner described with respect to the processes of FIGS. 8-10 and the example herein described with respect to FIGS. 18, but uses the non-low latency load thresholds in chart 1700 instead that are reduced to dedicate 10% of the total load capacity for low-latency network traffic.

Also, a chart and/or corresponding data structure similar to that of FIG. 17 using load thresholds shown therein may be generated or used by the SMF 102 to perform UPF load balancing supporting multiple slices as described herein with respect to the processes of FIGS. 11-13. In such an embodiment, the chart and/or corresponding data structure also or instead indicates such load-thresholds for each slice depending on the UPF and network slice capacity. For example, these load thresholds may be percentage based, such as 30%, 55%, and 75% for slice 1 and 30%, 45%, and 65% for slice 2. Also, depending on the UPFs slice based load-regions, the SMF 102 creates slice based weights for a weighted load balancing between slices of different UPFs. The SMF 102 maintains the load-regions of the UPFs and creates the slice weights for the weighted load balancing of the UEs/PDU sessions among the UPFs. In such an embodiment, depending on the UPFs slice loads, the SMF 102 creates slice weights for a weighted load balancing of the UEs/PDU sessions among the UPFs.

In various embodiments, there may be additional UPFs and additional corresponding data centers. Additional load regions may be determined for each UPF, and the weighting and load balancing may be performed, in one example embodiment as described herein, to adjust the probabilities that a new UE appearing in the network is anchored on a particular UPF based on determined load regions for each UPF and the location of the UE. Such load balancing may instead be achieved using credit/token based scheduling (e.g., weighted round robin).

Figure 21:
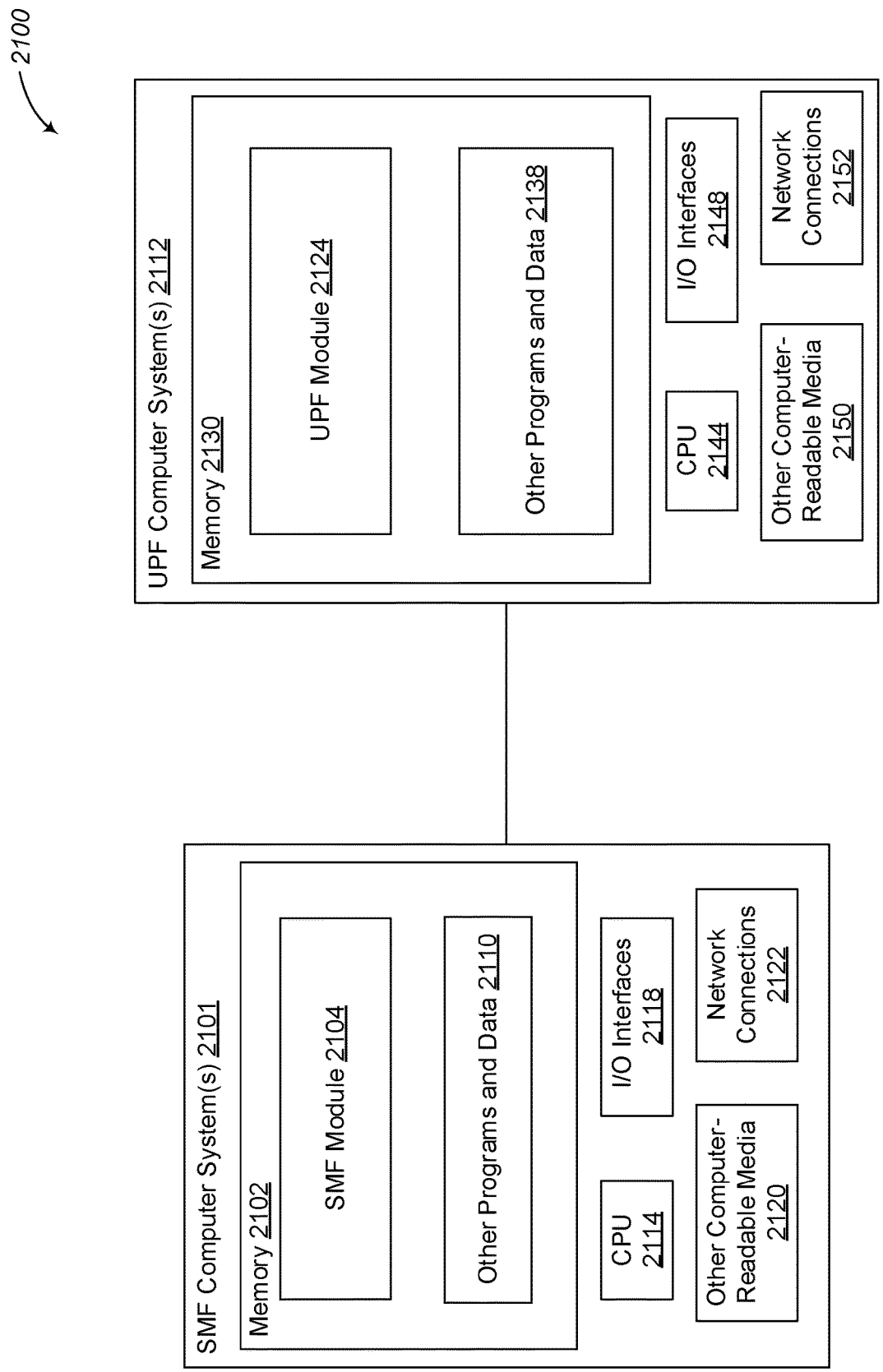
FIG. 21 shows a system diagram that describe various implementations of computing systems for implementing embodiments described herein.

FIG. 21 shows a system diagram that describe various implementations of computing systems 2100 for implementing embodiments described herein.

The SMF 102 and the UPF, such as UPF1 104 and UPF2 106, can be implemented either as a network elements on dedicated hardware, as a software instance running on dedicated hardware, or as a virtualized function instantiated on an appropriate platform, e.g., a cloud infrastructure. In some embodiments, such NFs may be completely software-based and designed as cloud-native, meaning that they're agnostic to the underlying cloud infrastructure, allowing higher deployment agility and flexibility. However, FIG. 21 illustrates an example of underlying hardware on which the SMF 102 and the UPF, such as UPF1 104 and UPF2 106, may be implemented. For example, SMF 102 may be implemented using SMF computer system(s) 2101. In some embodiments, one or more special-purpose computing systems may be used to implement SMF 102. Accordingly, various embodiments described herein may be implemented in software, hardware, firmware, or in some combination thereof. SMF computer system(s) 2101 may include memory 2102, one or more central processing units (CPUs) 2114, I/O interfaces 2118, other computer-readable media 2120, and network connections 2122.

Memory 2102 may include one or more various types of non-volatile and/or volatile storage technologies. Examples of memory 2102 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 2102 may be utilized to store information, including computer-readable instructions that are utilized by CPU 2114 to perform actions, including embodiments described herein.

Memory 2102 may have stored thereon SMF module 2104. The SMF module 2104 is configured to implement and/or perform some or all of the functions of the SMF 102 described herein. Memory 2102 may also store other programs and data 2110, which may include load thresholds, load-regions, databases, load-balancing rules, AI or ML programs to perform predictive analysis of UPF load based on predicted UE throughput, CPU utilization and/or memory utilization using data from the NWDAF, user interfaces, operating systems, other network management functions, other NFs, etc.

Network connections 2122 are configured to communicate with other computing devices to facilitate the load balancing described herein. In various embodiments, the network connections 2122 include transmitters and receivers (not illustrated) to send and receive data as described herein, such as sending data to and receiving data from UPFs, UEs and other NFs to send and receive instructions, commands and data to implement the processes described herein. I/O interfaces 2118 may include a video interfaces, other data input or output interfaces, or the like. Other computer-readable media 2120 may include other types of stationary or removable computer-readable media, such as removable flash drives, external hard drives, or the like.

In some embodiments, one or more special-purpose computing systems may be used to implement UPF, such as UPF1 104 and UPF2 106. Accordingly, various embodiments described herein may be implemented in software, hardware, firmware, or in some combination thereof. UPF computer system(s) 2112 is an example of a computer system that may implement a UPF, such as UPF1 104 and UPF2 106. For example, computer system(s) 2112 may be present in data center 1 to implement UPF1 104 or present in data center 2 to implement UPF2 106. Computer system(s) 2112 may include memory 2130, one or more central processing units (CPUs) 2144, I/O interfaces 2148, other computer-readable media 2150, and network connections 2152.

Memory 2130 may include one or more various types of non-volatile and/or volatile storage technologies similar to memory 2102. Memory 2130 may be utilized to store information, including computer-readable instructions that are utilized by CPU 2144 to perform actions, including embodiments described herein.

Memory 2130 may have stored thereon UPF module 2124. The UPF module 214 receives the messages or instructions from the SMF module 204 to perform the load balancing operations as described herein. Memory 2130 may also store other programs and data 2138, which may include load thresholds, load-regions, databases, load-balancing rules, AI or ML programs to perform predictive analysis of UPF load based on predicted UE throughput, CPU utilization and/or memory utilization using data from the NWDAF, user interfaces, operating systems, other network management functions, other NFs, etc.

Network connections 2152 are configured to communicate with other computing devices, such as SMF computer system(s) 2101. In various embodiments, the network connections 2152 include transmitters and receivers (not illustrated) to send and receive data as described herein. I/O interfaces 2148 may include one or more other data input or output interfaces. Other computer-readable media 2150 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a memory that stores computer instructions; and
    a processor that executes the computer instructions to perform actions, the actions including:
        maintaining a plurality of load thresholds for each user plane function (UPF) of a plurality of UPFs in a cellular telecommunication network, wherein:
            the plurality of UPFs serve as anchor points between user equipment (UE) in the cellular telecommunication network and a data network (DN);
            each UPF of the plurality of UPFs is a virtual network function responsible for interconnecting packet data unit (PDU) sessions between the user equipment (UE) and the DN by anchoring the PDU sessions on individual UPFs;
            the plurality of load thresholds for each UPF depend on a respective capacity of each UPF to have PDU sessions anchored thereon; and
            an amount of load put on a UPF by a UE appearing in the cellular telecommunication network is assumed to be identical for all UEs appearing in the cellular telecommunication network;
        receiving a request to anchor on a UPF a PDU session of a new UE newly appearing on the cellular telecommunication network;
        selecting a UPF of the plurality of UPFs on which to anchor the PDU session based on determined load-regions for each UPF of the plurality of UPFs defined by the plurality of load thresholds; and
        anchoring the PDU session of the new UE to the selected UPF.

2. The system of claim 1, wherein the selecting a UPF of the plurality of UPFs includes:
    generating weights for selecting the UPF based on the determined load-regions; and
    selecting the UPF based on the generated weights.

3. The system of claim 2, wherein the selecting a UPF of the plurality of UPFs includes:
    generating multiple load-regions, wherein each load-region corresponds to a different range of current load of a UPF defined by one or more of lower and upper threshold percentages of UPF load capacity;
    in response to receiving the request to anchor the PDU session, for each UPF of the plurality of UPFs, determining a load region from the multiple load-regions that a current load of the UPF falls within; and
    selecting a UPF of the plurality of UPFs based on the determined load-regions for the plurality of UPFs and the weights generated based on the determined load regions.

4. The system of claim 3 wherein selecting a UPF of the plurality of UPFs based on the generated weights and the determined load-regions for the plurality of UPFs includes:
    selecting the particular UPF in response to the determined load-region of the particular UPF being a load-region indicating a current load of the particular UPF is below a threshold capacity.

5. The system of claim 3, the selecting a UPF of the plurality of UPFs based on the generated weights and the determined load-regions for the plurality of UPFs includes:
    determining whether the particular UPF has a determined load region indicating a current load of the particular UPF is in a different load region indicating a higher current load of the particular UPF than a current load of another UPF of the plurality of UPFs; and
    in response to the particular UPF having a determined load region indicating the current load of the particular UPF is in a different load region indicating a higher current load of the particular UPF than the current load of another UPF of the plurality of UPFs, weighting the selection of a UPF of the plurality of UPFs such that the particular UPF is not overloaded compared to the other UPF of the plurality of UPFs by using credit/token-based weighted scheduling or probability-based weighted scheduling.

6. The system of claim 3, wherein:
    the selection of the UPF is weighted by using credit/token-based weighted scheduling or probability-based weighted scheduling such that the frequency of selection of the particular UPF decreases as a difference between a higher current load of the particular UPF and a lower current load of at least one UPF of the plurality of UPFs increases, as indicated by the load regions determined for each UPF of the plurality of UPFs.

7. The system of claim 3 wherein the generating multiple load-regions includes:
    generating a lowest load-region indicating a current UPF load less than a first threshold percentage of UPF capacity;
    generating one or more intermediate non-overlapping load-regions each defined by respective lower and upper threshold percentages of UPF capacity and indicating a current load greater than the lowest load-region; and
    generating a highest load-region indicating a current UPF load greater than a second threshold percentage of UPF capacity and greater than the one or more intermediate non-overlapping load-regions.

8. A method, comprising:
    electronically maintaining a plurality of load thresholds for each user plane function (UPF) of a plurality of UPFs in a cellular telecommunication network, wherein:
        the plurality of UPFs serve as anchor points between user equipment (UE) in the cellular telecommunication network and a data network (DN);
        each UPF of the plurality of UPFs is a virtual network function responsible for interconnecting packet data unit (PDU) sessions between the user equipment (UE) and the DN by anchoring the PDU sessions on individual UPFs;
        the plurality of load thresholds for each UPF depend on a respective capacity of each UPF to have PDU sessions anchored thereon; and
        an amount of load put on a UPF by a UE appearing in the cellular telecommunication network is assumed to be identical for all UEs appearing in the cellular telecommunication network;

electronically receiving a request to anchor on a UPF a PDU session of a new UE newly appearing on the cellular telecommunication network;

electronically selecting a UPF of the plurality of UPFs on which to anchor the PDU session based on determined load-regions for each UPF of the plurality of UPFs defined by the plurality of load thresholds; and electronically anchoring the PDU session of the new UE to the selected UPF.

9. The method of claim 8, wherein the selecting a UPF of the plurality of UPFs includes:

generating weights for selecting the UPF based on the determined load-regions; and selecting the UPF based on the generated weights.

10. The method of claim 9, wherein the selecting a UPF of the plurality of UPFs includes:

generating multiple load-regions, wherein each load-region corresponds to a different range of current load of a UPF defined by one or more of lower and upper threshold percentages of UPF load capacity;

in response to receiving the request to anchor the PDU session, for each UPF of the plurality of UPFs, determining a load region from the multiple load-regions that a current load of the UPF falls within; and selecting a UPF of the plurality of UPFs based on the determined load-regions for the plurality of UPFs and the weights generated based on the determined load regions.

11. The method of claim 10 wherein selecting a UPF of the plurality of UPFs based on the generated weights and the determined load-regions for the plurality of UPFs includes:

selecting the particular UPF in response to the determined load-region of the particular UPF being a load-region indicating a current load of the particular UPF is below a threshold capacity.

12. The method of claim 10, wherein the selecting a UPF of the plurality of UPFs based on the generated weights and the determined load-regions for the plurality of UPFs includes:

determining whether the particular UPF has a determined load region indicating a current load of the particular UPF is in a different load region indicating a higher current load of the particular UPF than a current load of another UPF of the plurality of UPFs; and in response to the particular UPF having a determined load region indicating the current load of the particular UPF is in a different load region indicating a higher current load of the particular UPF than the current load of another UPF of the plurality of UPFs, weighting the selection of a UPF of the plurality of UPFs such that the particular UPF is not overloaded compared to the other UPF of the plurality of UPFs by using credit/token-based weighted scheduling or probability-based weighted scheduling.

13. The method of claim 10, wherein:

the selection of the UPF is weighted by using credit/token-based weighted scheduling or probability-based weighted scheduling such that the frequency of selection of the particular UPF decreases as a difference between a higher current load of the particular UPF and a lower current load of at least one UPF of the plurality of UPFs increases, as indicated by the load regions determined for each UPF of the plurality of UPFs.

14. The method of claim 10 wherein the generating multiple load-regions includes:

generating a lowest load-region indicating a current UPF load less than a first threshold percentage of UPF capacity;

generating one or more intermediate non-overlapping load-regions each defined by respective lower and upper threshold percentages of UPF capacity and indicating a current load greater than the lowest load-region; and generating a highest load-region indicating a current UPF load greater than a second threshold percentage of UPF capacity and greater than the one or more intermediate non-overlapping load-regions.

15. A non-transitory computer-readable storage medium having computer-executable instructions stored thereon that, when executed by at least one computer processor, cause actions to be performed including:

maintaining a plurality of load thresholds for each user plane function (UPF) of a plurality of UPFs in a cellular telecommunication network, wherein:

the plurality of UPFs serve as anchor points between user equipment (UE) in the cellular telecommunication network and a data network (DN);

each UPF of the plurality of UPFs is a virtual network function responsible for interconnecting packet data unit (PDU) sessions between the user equipment (UE) and the DN by anchoring the PDU sessions on individual UPFs;

the plurality of load thresholds for each UPF depend on a respective capacity of each UPF to have PDU sessions anchored thereon; and an amount of load put on a UPF by a UE appearing in the cellular telecommunication network is assumed to be identical for all UEs appearing in the cellular telecommunication network;

receiving a request to anchor on a UPF a PDU session of a new UE newly appearing on the cellular telecommunication network;

selecting a UPF of the plurality of UPFs on which to anchor the PDU session based on determined load-regions for each UPF of the plurality of UPFs defined by the plurality of load thresholds; and anchoring the PDU session of the new UE to the selected UPF.

16. The non-transitory computer-readable storage medium of claim 15, wherein the selecting a UPF of the plurality of UPFs includes:

generating weights for selecting the UPF based on the determined load-regions; and selecting the UPF based on the generated weights.

17. The non-transitory computer-readable storage medium of claim 16, wherein the selecting a UPF of the plurality of UPFs includes:

generating multiple load-regions, wherein each load-region corresponds to a different range of current load of a UPF defined by one or more of lower and upper threshold percentages of UPF load capacity;

in response to receiving the request to anchor the PDU session, for each UPF of the plurality of UPFs, determining a load region from the multiple load-regions that a current load of the UPF falls within; and selecting a UPF of the plurality of UPFs based on the determined load-regions for the plurality of UPFs and the weights generated based on the determined load regions.

18. The non-transitory computer-readable storage medium of claim 17 wherein selecting a UPF of the plurality of UPFs based on the generated weights and the determined load-regions for the plurality of UPFs includes:
    selecting the particular UPF in response to the determined load-region of the particular UPF being a load-region indicating a current load of the particular UPF is below a threshold capacity.

19. The non-transitory computer-readable storage medium of claim 17, wherein the selecting a UPF of the plurality of UPFs based on the generated weights and the determined load-regions for the plurality of UPFs includes:
    determining whether the particular UPF has a determined load region indicating a current load of the particular UPF is in a different load region indicating a higher current load of the particular UPF than a current load of another UPF of the plurality of UPFs; and
    in response to the particular UPF having a determined load region indicating the current load of the particular UPF is in a different load region indicating a higher current load of the particular UPF than the current load of another UPF of the plurality of UPFs, weighting the selection of a UPF of the plurality of UPFs such that the particular UPF is not overloaded compared to the other UPF of the plurality of UPFs by using credit/token-based weighted scheduling or probability-based weighted scheduling.

20. The non-transitory computer-readable storage medium of claim 17, wherein:
    the selection of the UPF is weighted by using credit/token-based weighted scheduling or probability-based weighted scheduling such that the frequency of selection of the particular UPF decreases as a difference between a higher current load of the particular UPF and a lower current load of at least one UPF of the plurality of UPFs increases, as indicated by the load regions determined for each UPF of the plurality of UPFs.

* * * * *